(12) United States Patent
Chen et al.

(10) Patent No.: US 11,205,552 B2
(45) Date of Patent: Dec. 21, 2021

(54) HYBRID ARC/GROUND FAULT CIRCUIT INTERRUPTER AND METHODS OF OPERATION THEREOF

(71) Applicant: Ze Chen, Yueqing (CN)

(72) Inventors: Ze Chen, Yueqing (CN); Boon Lum Lim, Singapore (SG); Samuel Raj, Singapore (SG)

(73) Assignee: Ze Chen, Yueqing (CN)

( * ) Notice: Subject to any disclaimer, the term of this patent is extended or adjusted under 35 U.S.C. 154(b) by 52 days.

(21) Appl. No.: 16/518,070

(22) Filed: Jul. 22, 2019

(65) Prior Publication Data

US 2020/0411268 A1 Dec. 31, 2020

Related U.S. Application Data

(63) Continuation of application No. 15/582,746, filed on Apr. 30, 2017, now Pat. No. 10,410,816, which is a
(Continued)

(51) Int. Cl.
  *H01H 71/02* (2006.01)
  *H02H 9/08* (2006.01)
  (Continued)

(52) U.S. Cl.
  CPC ...... *H01H 71/0207* (2013.01); *H01H 47/002* (2013.01); *H01H 50/02* (2013.01); *H01H 50/44* (2013.01); *H01H 71/04* (2013.01); *H01H 71/62* (2013.01); *H01H 83/04* (2013.01); *H01H 83/144* (2013.01); *H02H 1/0015* (2013.01); *H02H 3/16* (2013.01); *H02H 3/32* (2013.01); *H02H 3/33* (2013.01); *H02H 3/335* (2013.01); *H01H 71/2463* (2013.01);
(Continued)

(58) Field of Classification Search
  CPC .... H01H 71/0207; H01H 71/04; H01H 71/62; H01H 83/04
  See application file for complete search history.

(56) References Cited

U.S. PATENT DOCUMENTS 5,280,404 A  1/1994 Ragsdale
5,729,145 A  3/1998 Blades
(Continued)

FOREIGN PATENT DOCUMENTS

CN  201210024531.5  2/2012

*Primary Examiner* — Scott Bauer
(74) *Attorney, Agent, or Firm* — Mei & Mark LLP

(57) ABSTRACT

In one example, a hybrid circuit interrupter may include a three-coil architecture, first coil circuitry, leakage detection circuitry, and a main processing circuit including a processor. The three-coil architecture may include a coil housing, three coils, and a plurality of coil assembly conductors. The coils may be disposed within the coil housing. The coil assembly conductors may be at least partially disposed within the coil housing. The first coil circuitry may be connected to the first coil and may generate first coil signals. The leakage detection circuitry may be connected to the other two coils and may generate a leakage signal. The processor may receive the first coil signals, receive the leakage signal, determine whether an arc fault exists based on the first coil signals, determine whether a ground fault exists based on the leakage signal, and generate a first trigger signal if a fault is determined to exist.

20 Claims, 27 Drawing Sheets

Related U.S. Application Data continuation-in-part of application No. 15/269,513, filed on Sep. 19, 2016, now Pat. No. 10,476,252, which is a continuation-in-part of application No. 15/393,440, filed on Dec. 29, 2016, now Pat. No. 10,439,387.

(51) Int. Cl.

| | | |
|---|---|---|
| *H02H 1/00* | (2006.01) | |
| *H01H 71/04* | (2006.01) | |
| *H01H 71/62* | (2006.01) | |
| *H01H 83/04* | (2006.01) | |
| *H02H 3/32* | (2006.01) | |
| *H01H 47/00* | (2006.01) | |
| *H01H 50/02* | (2006.01) | |
| *H01H 50/44* | (2006.01) | |
| *H01H 83/14* | (2006.01) | |
| *H02H 3/16* | (2006.01) | |
| *H02H 3/33* | (2006.01) | |
| *H01H 71/24* | (2006.01) | |
| *H01H 71/58* | (2006.01) | |
| *H01H 83/20* | (2006.01) | |
| *H01H 89/00* | (2006.01) | |
| *H02H 3/04* | (2006.01) | |

(52) U.S. Cl.
CPC ....... *H01H 71/58* (2013.01); *H01H 2071/044* (2013.01); *H01H 2083/148* (2013.01); *H01H 2083/201* (2013.01); *H01H 2089/005* (2013.01); *H02H 1/0007* (2013.01); *H02H 3/04* (2013.01)

(56) References Cited

U.S. PATENT DOCUMENTS

| | | |
|---|---|---|
| 7,253,637 B2 | 8/2007 | Dvorak |
| 8,599,523 B1 | 12/2013 | Ostrovsky |
| 8,779,875 B2 | 7/2014 | Chen |
| 8,847,712 B2 | 9/2014 | Chen |
| 2003/0085783 A1* | 5/2003 | Macbeth .................. H02H 3/05 335/18 |
| 2003/0102944 A1 | 6/2003 | Leopold |
| 2004/0066593 A1 | 4/2004 | Kolker |
| 2005/0264962 A1 | 12/2005 | Kim |
| 2005/0286184 A1 | 12/2005 | Campolo |
| 2006/0114627 A1 | 6/2006 | Wong |
| 2006/0279886 A1 | 12/2006 | Huang |
| 2007/0030608 A1 | 2/2007 | Baldwin |
| 2008/0129307 A1 | 6/2008 | Yu |
| 2010/0060469 A1 | 3/2010 | Hetzmannseder |
| 2010/0157488 A1 | 6/2010 | Hall |
| 2010/0324747 A1 | 12/2010 | Lee |
| 2014/0098446 A1 | 4/2014 | Aromin |
| 2014/0268437 A1 | 9/2014 | Simonin |
| 2016/0294179 A1 | 10/2016 | Kennedy |
| 2018/0083434 A1 | 3/2018 | Lim |
| 2018/0191150 A1 | 7/2018 | Chen |

\* cited by examiner

FIG. 5H     FIG. 5I

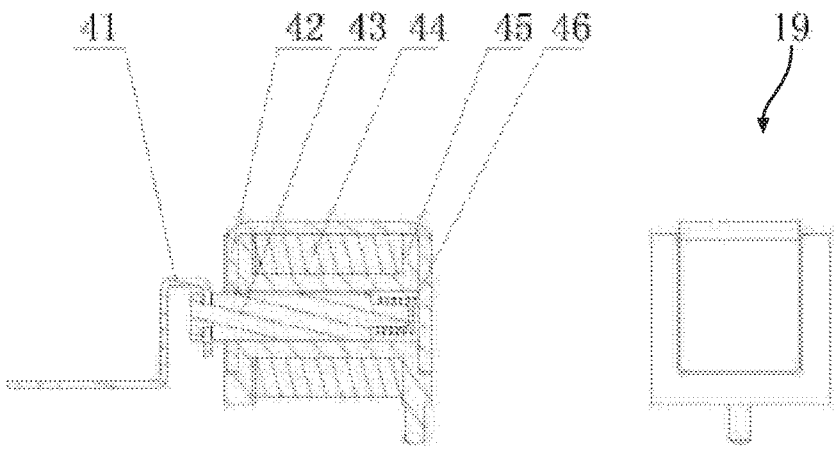
FIG. 5K  FIG. 5L
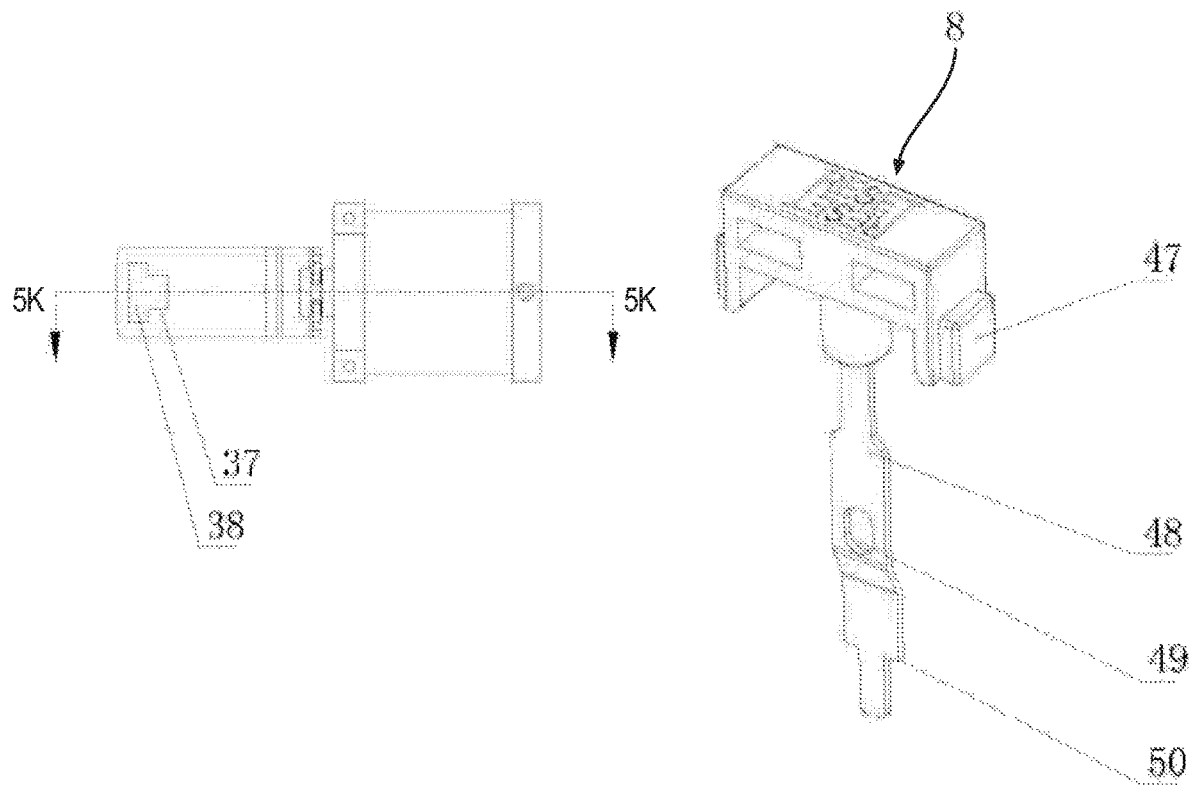
FIG. 5M  FIG. 5N

HYBRID ARC/GROUND FAULT CIRCUIT INTERRUPTER AND METHODS OF OPERATION THEREOF

This application is a continuation of U.S. patent application Ser. No. 15/582,746, filed on Apr. 30, 2017, which is a continuation-in-part of U.S. patent application Ser. No. 15/269,513, filed on Sep. 19, 2016, and a continuation-in-part of U.S. patent application Ser. No. 15/393,440, filed on Dec. 29, 2016, the disclosures of which are all herein incorporated by reference in their entireties.

TECHNICAL FIELD

The present disclosure relates to apparatuses, systems, and algorithmic methods for evaluating potential ground fault phenomenon and potential arc fault phenomena, in particular within a circuit interrupter device. The present disclosure also pertains to circuit interrupter devices.

BACKGROUND

Conventional earth current leakage circuit breakers and over-current fuses are commonly deployed to prevent injuries to people and property from dangerous conditions resulting from, for example, current leakages or fires resulting from electrical faults such as current arcs or severe current leakages. Such devices typically detect the occurrence of certain types of electrical faults to prevent harm to persons and property. However, when such conventional devices are employed, some electrical faults may not be detected and such devices may falsely detect electrical faults where none exist. Such errors may be due to the lack of intelligent ground fault and/or arc fault identification systems in conventional devices.

Ground faults may be commonly defined as the existence of a current imbalance between the supply and the return path wherein an undesirable and significant amount of the unreturned current is leaking, or passing through an object— for example a human body, to the ground. Notably, the passage of electrical current through the human body may cause injury or even death.

A current arc is typically caused by a current surging over separated or poorly contacting electrical surfaces within electrical equipment, for example, in its power cord or in an electrical device itself; or within damaged electrical wiring, such as, within the walls of a building. Current arc electrical faults may be defined as current through ionized gas between the two (e.g., supply-side and load-side) separated or poorly contacting electrical surfaces. Such current arcs are often characterized by sparking and extremely high heat, and as a result can cause electrical fires. For example, electrical fires may start when the heat and/or sparking of a current arc causes insulating material or construction material in the vicinity of the electrical fault to combust. Current arc-caused electrical fires may damage property or even endanger human life.

Unfortunately, conventional circuit breakers, fuses, or Ground Fault Circuit Interrupter (GFCI) protection devices typically cannot detect—and consequently halt—current arc electrical faults, unless a current arc produces sufficient current leakage to the electrical ground to be detected by a GFCI and/or results in a sufficient current imbalance to be detected by leakage current coil circuit. Often, an arc fault does not involve current leaking to a ground conductor or any conducting devices to the ground; it is therefore unlikely to result in a substantial current imbalance between the supply and the load.

Underwriters Laboratories (UL), an American Worldwide Safety Consulting and Certification Organization, provides criteria that ground fault detection and arc fault detection devices must meet in order to qualify as approved detection devices. Such criteria may further require such detection devices to avoid false detection of electrical faults when provided with current draws that may resemble ground faults, such as back-EMF noise or certain pulsed current draws, or may resemble arc faults. UL has also provided criteria requiring mechanisms that prevents the supply of power and/or alerts a user where detection devices are improperly installed, for example, where improper installation may hinder the effectiveness of ground fault or arc fault detection or otherwise cause the detection device to malfunction.

A combination device that protects users and electrical appliances from both ground faults and arc faults may be desired. However, existing devices that combine the functionality of both GFCIs and AFCIs operate by including substantially full sets of both GFCI circuitry and AFCI circuitry. Due to the inclusion of two sets of components, such devices may be undesirably expensive to manufacture, heavy, or have a large footprint. Improved combination or hybrid fault detection and circuit interrupter devices may be desired.

It may further be desired that such combination device comply with UL criteria governing both AFCIs and GFCIs. Because the failure to detect an actual arc fault may result in serious safety hazards, conventional apparatuses are typically over-inclusive when determining the presence of an arc fault. Such conventional apparatuses do not provide for analysis or investigation of the nature of the leakage waveform. While erring on the side of determining that electrical faults exist may have beneficial safety effects, this may increase the frequency of both false positives of arc fault detection and unnecessary tripping of circuit interrupter devices.

It may be desirable for such circuit interrupter devices to detect an end-of-life (EOL) condition. It may also be desirable for circuit interrupter devices to include locking mechanisms to provide additional protection from inadvertent resetting, and to enable an end-of-life (EOL) state, where no further reset operation is possible.

Additionally, there remains a need for a tripping mechanism to ensure a proper, flexible trip operation at the time desired. There further remains a need for such a tripping mechanism to provide automatic and/or manual testing functionality to ensure that the electrical protection devices work properly.

SUMMARY

The present disclosure provides a description of apparatuses, systems, and methods to address the perceived needs and desires described above.

In one example, a hybrid circuit interrupter may include a three-coil architecture, first coil circuitry, leakage detection circuitry, and a main processing circuit that includes a processor. The three-coil architecture may include a coil housing, a first coil, a second coil, a third coil and a plurality of coil assembly conductors. The first, second, and third coils may be disposed within the coil housing. The plurality of coil assembly conductors may be alt least partially disposed within the coil housing. The first coil circuitry may be connected to the first coil and may be configured to generate first coil signals. The leakage detection circuitry may be connected to the second and third coils and may be configured to generate a leakage signal. The processor may be configured to receive the first coil signals from the first coil circuitry, receive the leakage signal from the leakage detection circuitry, determine whether an arc fault exists based on the first coil signals, determine whether a ground fault exists based on the leakage signal, and generate a first trigger signal if a ground fault, an arc fault, or both is determined to exist.

In another example, the hybrid circuit interrupter may include a trip coil assembly. The trip coil assembly may be configured to trip the hybrid circuit interrupter upon receiving the first trigger signal.

In yet another example, the hybrid circuit interrupter may include a reset blocking assembly with a locked position and an unlocked position. The reset blocking assembly may be configured to mechanically prevent the resetting of the hybrid circuit interrupter when in in the locked position. The reset blocking assembly may be configured to move into the locked position upon receiving a second trigger signal. The processor may be further configured to generate the second trigger signal if a ground fault, an arc fault, or both is determined to exist.

In yet other examples, the first coil may have 900-1100 turns, the second coil may have 150-250 turns, and third coil may have 900-1100 turns.

In yet another example, the coil housing may include a first upper central recess, a second upper central recess, a first lower central recess, and a second lower central recess. The first upper central recess and the first lower central recess may be adjoined. The second upper central recess and the second lower central recess may be adjoined. The plurality of coil assembly conductors may include a first coil assembly input conductor, a second coil assembly input conductor, a first coil assembly output conductor, and a second coil assembly output conductor.

In yet another example, the first coil assembly input conductor may be disposed within the first lower central recess. The second coil assembly input conductor may be disposed within the second lower central recess. The first coil assembly output conductor may be disposed within the first upper central recess. The second coil assembly output conductor may be disposed within the second upper central recess. The first coil assembly input conductor and the first coil assembly output conductor may be electrically connected. The second coil assembly input conductor and the second coil assembly output conductor may be electrically connected. The first coil assembly input conductor and the first coil assembly output conductor may form a portion of a live line. The second coil assembly input conductor and the second coil assembly output conductor may form a portion of a neutral line. The plurality of coil assembly conductors may be comprised of copper.

In yet another example, the first coil signals may include an RMS voltage signal, an RMS current signal, and a rectangular waveform derived from the RMS current signal. The processor may be further configured to determine that an arc fault exists if: a pulse-width of a low of the rectangular wave form exceeds a predetermined amount of time, the maximum current of the rectangular wave form is above a current detection threshold, and the duty cycle of the rectangular wave form is above a maximum duty cycle detection threshold or below a minimum duty cycle threshold for at least a threshold number of cycles within a predetermined measurement window. The predetermined amount of time may be approximately 1 ms. The current detection threshold may be approximately 5 A. The maximum duty cycle detection threshold may be at or between 55% and 60%. The minimum duty cycle detection threshold may be at or between 40% and 45%. The threshold number of cycles may be 3.5 cycles of the duty cycle. The predetermined measurement window may be at least 1.5 seconds.

In yet another example, the processor may be further configured to determine that an arc fault exists if: the RMS current is greater than a maximum current threshold for at least a predetermined measurement window, and the RMS voltage is less than a minimum voltage threshold for at least a predetermined measurement window. The maximum current threshold may be approximately 70 A. The minimum voltage threshold may be approximately 50V. The predetermined measurement window may be one AC period.

In yet another example, the processor may be further configured to determine that an arc fault exists if a pulse count of the rectangular wave form is more than that a predetermined pulse count for a predetermined number of periods. The predetermined pulse count may be one pulse. The predetermined number of periods may be one AC period.

In yet another example, the hybrid circuit interrupter of may include a leakage simulation circuit.

In yet another example, the hybrid circuit interrupter of may include a failsafe circuit. The failsafe circuit may be configured to provide an alert when power is provided to the hybrid circuit interrupter unless the processor provides a failsafe signal.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate certain embodiments of the present disclosure and together with the description, serve to explain the principles of this disclosure.

FIGS. 5H-5J are views of a trip coil assembly of the embodiment of FIGS. 5A-5G.

FIGS. 5K-5M are views of a reset blocking assembly of the embodiment of FIGS. 5A-5G.

FIG. 5N is a perspective view of a reset button assembly of the embodiment of FIGS. 5A-5G.

DETAILED DESCRIPTION

Reference will now be made in detail to the present exemplary embodiments, examples of which are illustrated in the accompanying drawings. Wherever possible, the same reference numbers will be used throughout the drawings to refer to the same or like parts. While the description includes exemplary embodiments, other embodiments are possible, and changes may be made to the embodiments described without departing from the spirit and scope of the invention. The following detailed description does not limit the invention. Instead, the scope of the invention is defined by the appended claims and their equivalents.

As discussed herein, hybrid circuit interrupter (HCI) 400 may provide the functionality of both a GFCI and an AFCI in a single device. HCI 400 may advantageously detect and evaluate potential ground faults and arc faults; may determine that certain potential electrical faults and not true electrical faults but are rather caused by non-typical current draws by certain electrical appliances; may assess whether certain potential electrical faults are likely to be dangerous and halt the supply of electrical power in response; and may include a mechanism to prevent power supply when HCI 400 is improperly installed.

Figure 1A:
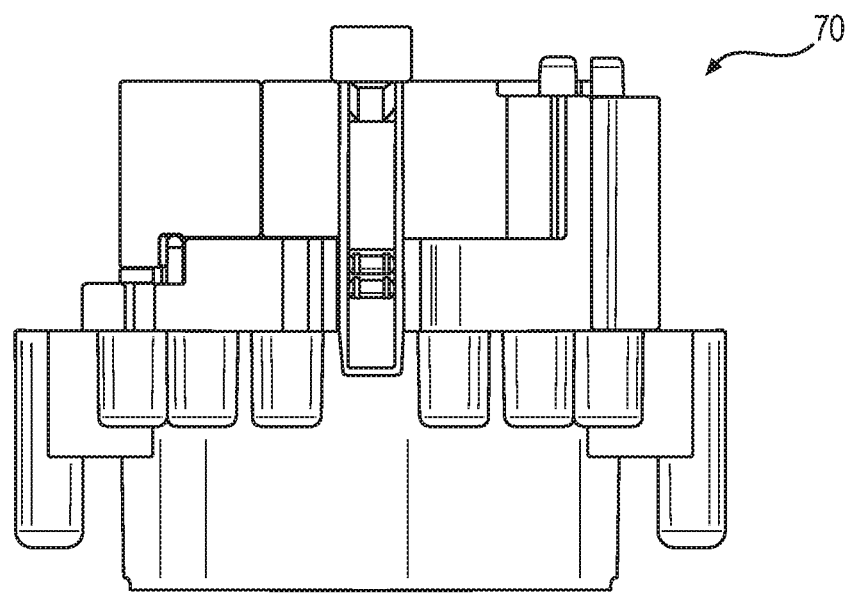
FIGS. 1A and 1B are front and cross-sectional views, respectively, of a coil housing of a hybrid circuit interrupter, consistent with the present disclosure.
Figure 1B:
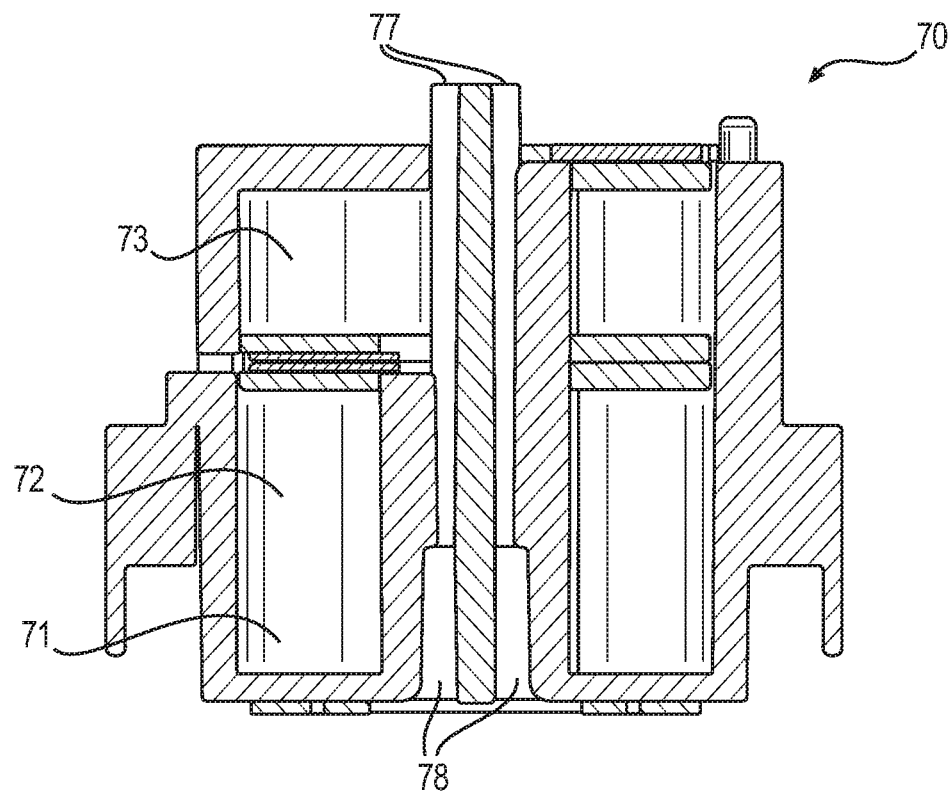

HCI 400 may include a 3-coil architecture to generate signals to be used both arc fault detection and ground fault detection. With reference to FIGS. 1A-1D, the 3-coil architecture may be contained in coil housing 70. FIG. 1A provides a front view of coil housing 70. FIG. 1B provides a cross-sectional view of coil housing 70 that illustrates exemplary positioning of coils 71, 72, and 73. Coil housing 70 may further include two upper central recesses 77 and two lower central recesses 78. Each upper central recess 77 may connect to its respective lower central recess 78. In preferred embodiments coil 72 is disposed upon coil 71, but they are not electrically connected.

Coil 71 may be directed towards current leakage detection or current imbalance detection. Coil 71 may generate an induced voltage that may be used to assess the presence of a ground fault. In preferred embodiments, coil 71 may have a ratio of ~900 to 1100:1 turns about the line surrounded by the coil. Coil 71 may operate at a 2 kHz-20 kHz range and may be considered a high frequency coil.

Coil 72 may be directed towards ground-neutral fault detection. Coil 72 may generate a signal that to becomes attenuated as frequency increases and loop gain decreases. Importantly, frequency may increase when there is a ground-neutral fault occurrence. In preferred embodiments, coil 72 may have a ratio of ~150 to 250:1 turns about the line surrounded by the coil. Coil 72 may operate at a 50 Hz-50 Hz range and may be considered a low frequency coil.

Coil 73 may be directed towards low frequency current detection and measurement. Coil 73 may be used to measure the current provided to the load. As discussed in more detail below, the signals provided by coil 73 may be used to assess the presence of an arc fault, and further to classify an arc fault as a series or parallel arc fault. In preferred embodiments, coil 73 may have a ratio of ~1000:1 turns about the line surrounded by the coil. For example, this may include 900-1100 turns. It may operate at a 50-60 Hz range and may be considered a low frequency coil.

Figure 1C:
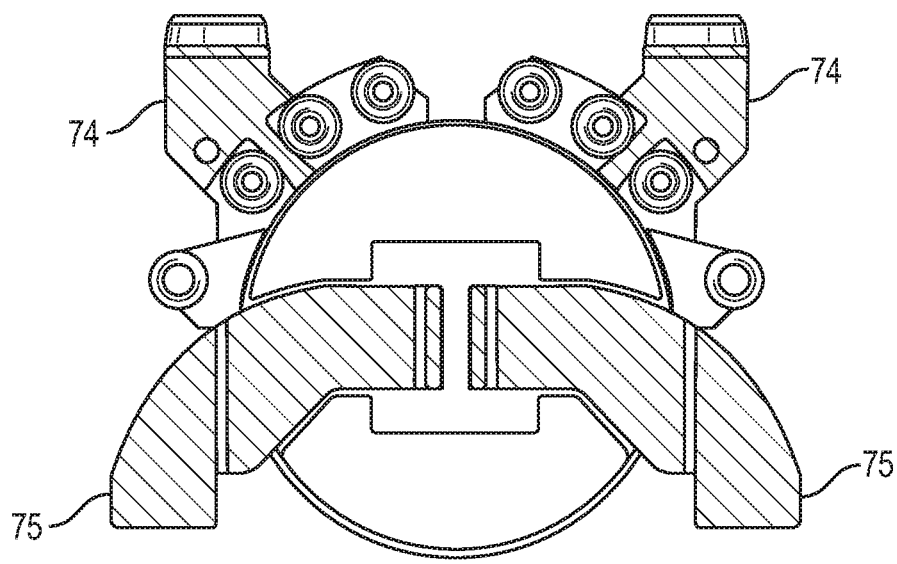
FIGS. 1C and 1D are bottom and side views, respectively, of the coil housing of FIGS. 1A and 1B, with coil assembly conductors, consistent with the present disclosure.
Figure 1D:
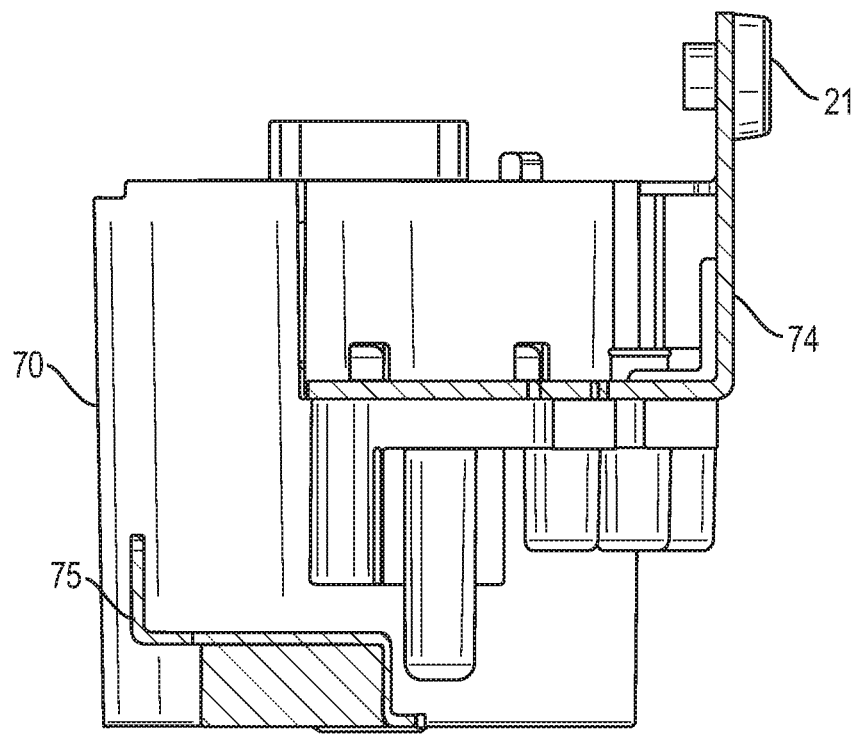

FIGS. 1C and 1D provide bottom and side views of coil housing 70, that further depict a pair of coil assembly output conductors 74 and a pair of coil assembly input conductors 75. Such coil assembly conductors may be considered part of the three-coil architecture. In preferred embodiments, each coil assembly output conductor 74 may be fitted within an upper central recess 77, and each coil assembly input conductor 75 may be fitted within a lower central recess 78. In such fashion, each coil assembly input conductor 75 may be configured to conduct to a corresponding coil assembly output conductor 74 through corresponding central recesses 77, 78. In preferred embodiments conductors 74 and 75 may be comprised of copper and may be disposed to securely fit within coil assembly 70. One set of coil assembly conductors 74, 75 may comprise a portion of the neutral line; the other set of coil assembly conductors 74,75 may comprise a portion of the live line. Each coil assembly output conductor 74 may terminate at an input static contact 21. Conductors 74 and 75 may be shaped as shown of FIGS. 1C-1D or may have other shapes suitable for inclusion within a particular HCI 400 configuration, for example, as shown in FIG. 5R.

Figure 3:
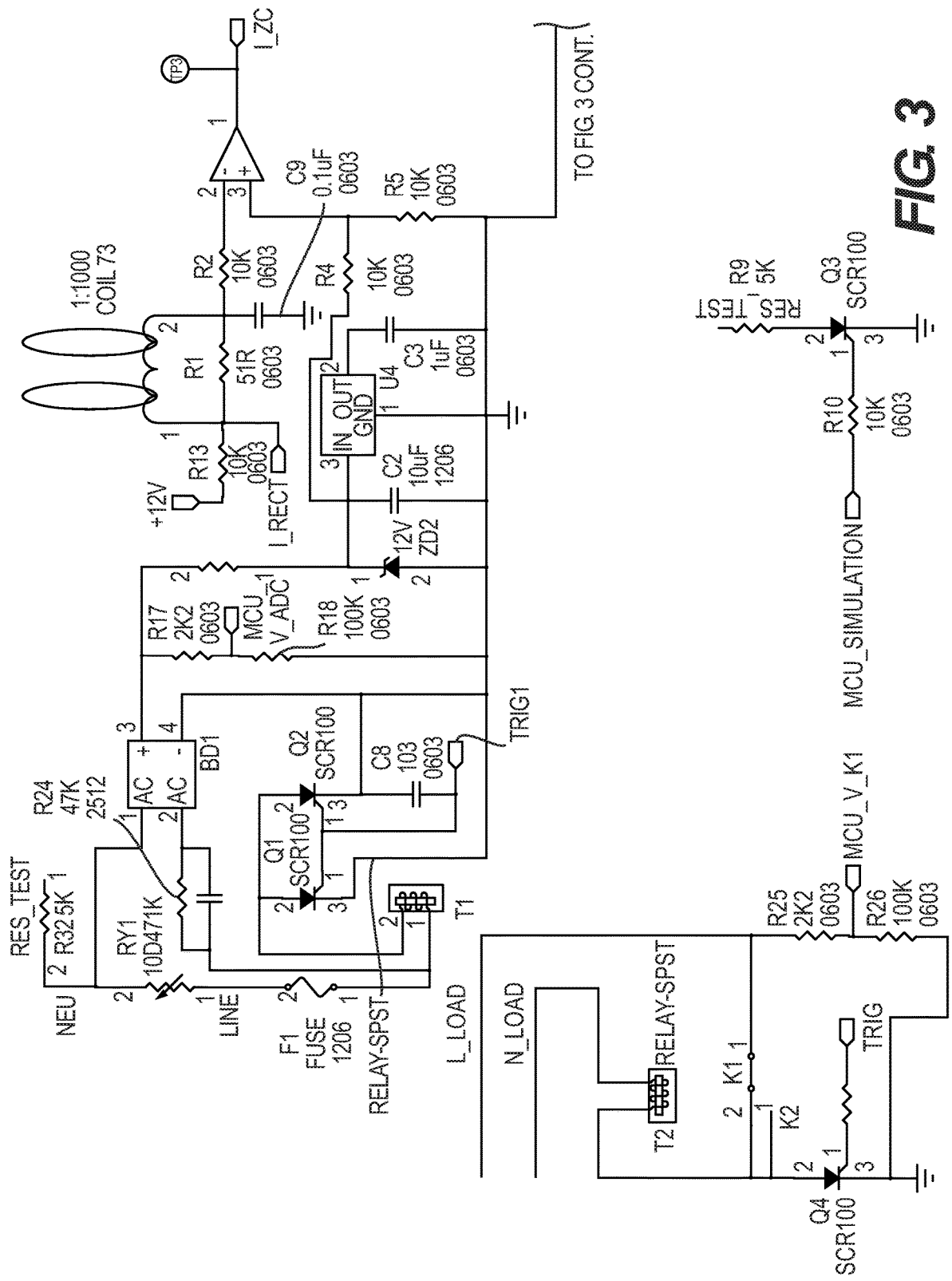
FIG. 3 depicts a circuit diagram of an embodiment of a hybrid circuit interrupter of the present disclosure.
Figure 3:
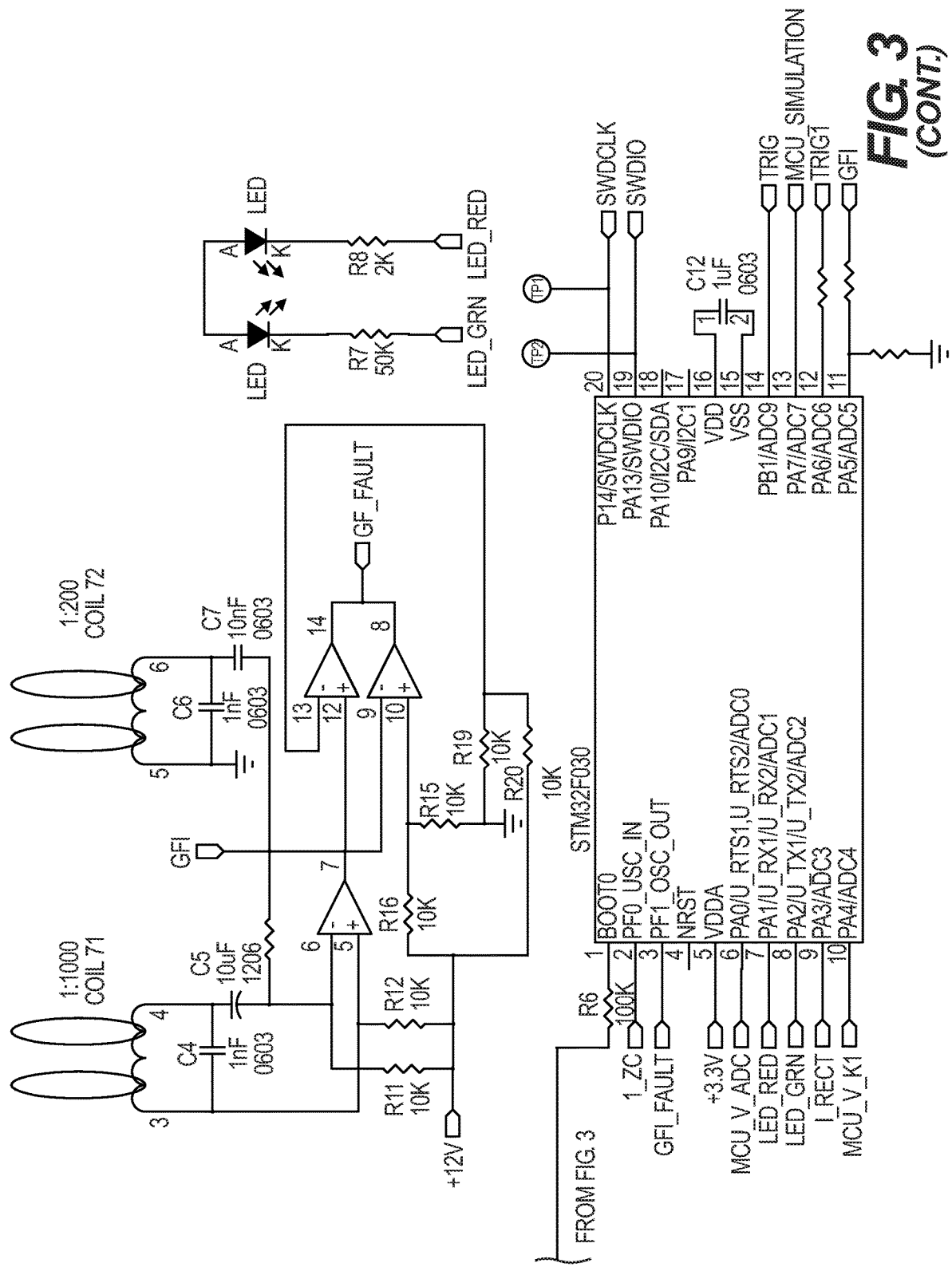

FIG. 3 depicts an exemplary circuit schematic for HCI circuitry 300. Algorithms and various computing and decision processes discussed herein may preferably be accomplished by software programed on a microcontroller unit (MCU) of HCI circuitry 300 or the like. With respect to the embodiment shown in the schematic of FIG. 3, MCU is embodied as element U2 and may be a STM32F030 microcontroller manufactured by STMicroelectronics or other suitable processor.

Via coils 71 and 72 and its leakage signal circuitry, HCI circuitry 300 may provide MCU a leakage signal indicative of current imbalance on the neutral and live lines (at GFI_FAULT). Such an imbalance may indicate the potential existence of a leakage current, and perhaps, a ground fault condition. When the leakage signal indicates a current imbalance above a certain threshold, for example, approximately 5-6 mA, MCU may determine that a ground fault is occurring.

Via coil 73 at its circuitry, HCI circuitry 300 may also provide an RMS voltage signature (at MCU_V_ADC), which may be used to determine the presence and/or classification of an arc fault.

Via coil 73 at its circuitry, HCI circuitry 300 may also provide an RMS current signature (at I_RECT), which may be used to determine the presence and/or classification of an arc fault.

Via coil 73 at its circuitry, HCI circuitry 300 may also provide, at I_ZC, a rectangular waveform derived from the RMS current single-sided current waveform (I_RECT). The signal at I_ZC may be understood to include both a time domain signature and a pulse signature, and may be used to determine the presence and/or classification of an arc fault.

In some embodiments (not shown in FIG. 3), HCI circuitry 300 may also provide a back-EMF detection signal that may be used to avoid false detection of ground faults that may result from back-EMF noise generated by certain electrical appliances.

Consistent with this disclosure, the respective signals may be processed and analyzed by the MCU to determine the presence of and/or classify a various electrical fault. Subsequent to such determination or clarification, MCU may, as appropriate, engage mechanisms to halt the supply of power, and place HCI 400 in a permanent or semi-permanent non-working (e.g., tripped) state. MCU may, in some embodiments, accomplish the functions described herein by executing a computer program stored on a non-transitory computer readable storage medium. Such computer readable storage medium may be included within MCU, external to MCU, or partially within and partially external to MCU. In alternative embodiments, a single IC may provide the functionality of MCU and additional elements of HCI circuitry 300.

When appropriate, for example, when a ground or arc fault is detected, MCU may provide a trip signal, for example, via TRIG1, as depicted in FIG. 3, to at least temporarily remove power provided to the relay T1 of FIG. 3 and thereby trip the HCI device 400 via mechanisms discussed below. This may place the HCI in a tripped condition, whereby the supply of power through HCI 400 is halted.

If appropriate, HCI circuitry 300, may also provide a locking signal at TRIG (pin 14) of MCU to reset blocking coil assembly 19 and put a tripped HCI device 400 in a locked state. In such a locked state, HCI 400 is mechanically prevented from resetting. The locked state may be an EOL state in some circumstances. That is, MCU may be programmed to, upon the occurrence of certain events, permanently disable its capability to take HCI device 400 out of a locked state and back into an unlocked state. In this manner, HCI 400 may achieve an EOL state whereby it permanently remains in a locked, tripped state.

Figure 4:
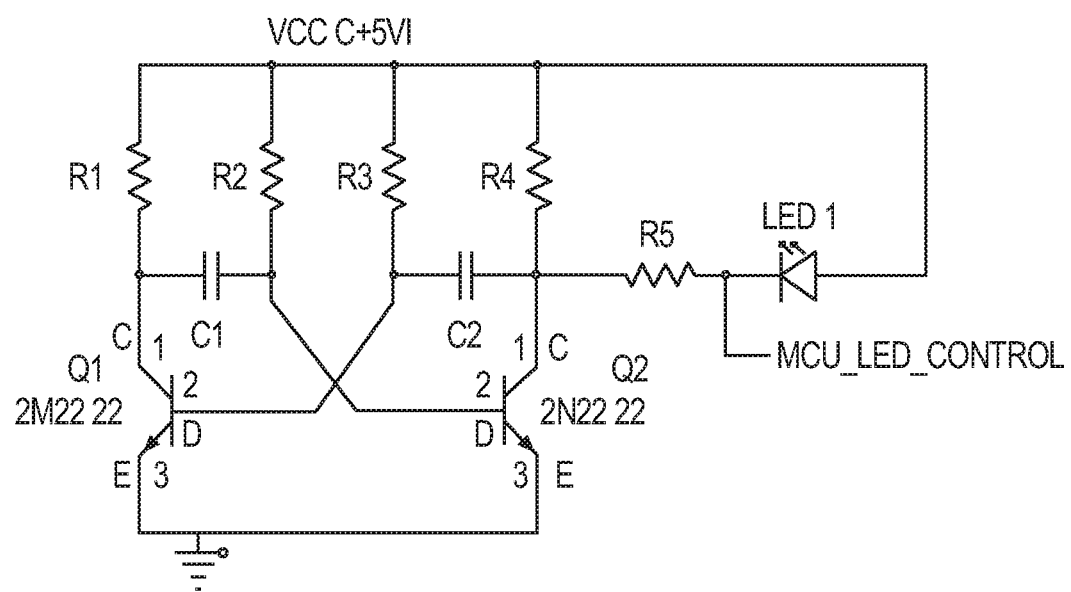
FIG. 4 depicts a circuit diagram of an embodiment of a failsafe circuit for a hybrid circuit interrupter, consistent with the present disclosure.

In some embodiments, HCI 400 may include additional fail-safes to prevent HCI from providing power operation if MCU suffers a malfunction. Because the electrical fault detection and self-testing described herein may only be reliable with a properly functioning MCU, it may be advantageous for HCI 400 to detect an MCU malfunction, and cease providing power and/or notify a user of the malfunction in response. To accomplish this, HCI circuitry 300 may include a failsafe circuit that would, as a default, maintain HCI 400 in a tripped state and/or provide a continuous alert signal. FIG. 4 illustrates an exemplary embodiment of such a failsafe circuit. The alert signal may, for example, cause a red LED of the HCI 400, e.g., D4 in FIG. 3, to blink indefinitely when an MCU failure is detected. MCU may be further programmed to provide a proper operation signal when it is functioning, for example at pin 7, which is the red LED to prevent such blinking. When the MCU provides the failsafe signal, the failsafe circuit will not be able to provide the continuous alert.

Figure 5A:
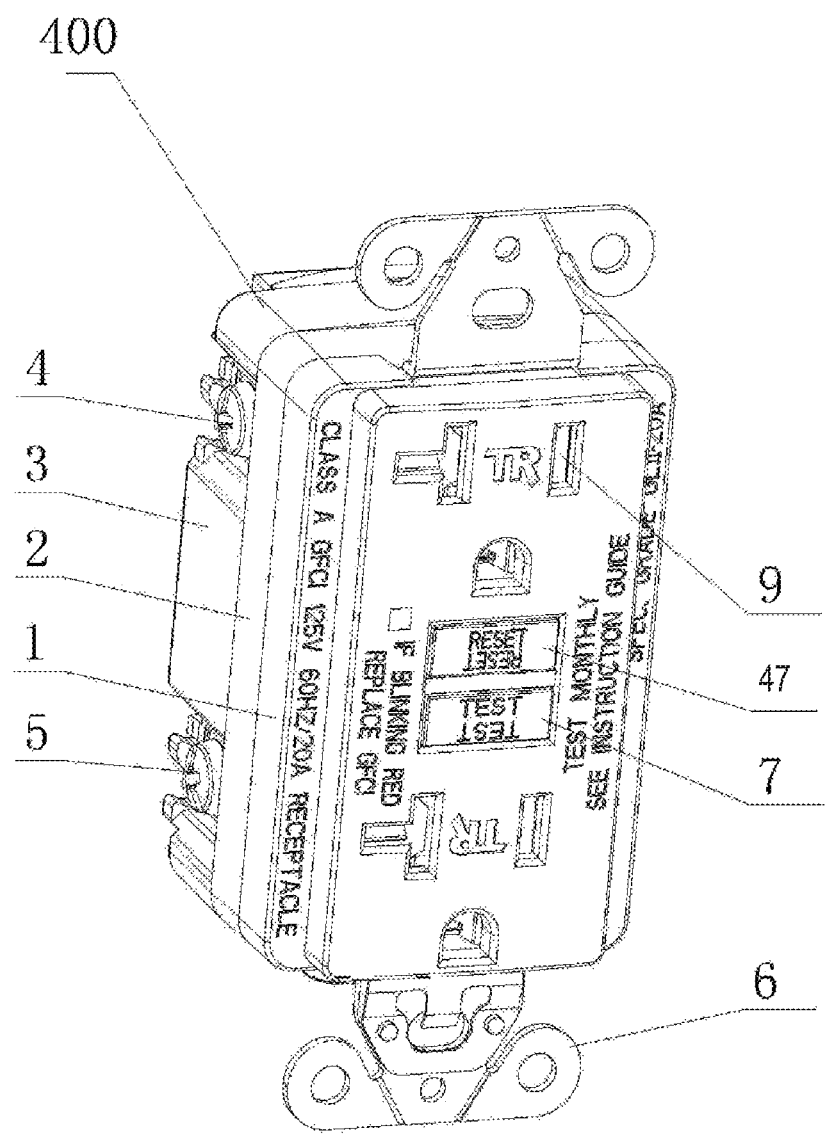
FIGS. 5A-5G are perspective, front, side, back, bottom, exploded, and further exploded views, respectively, of an embodiment of a hybrid circuit interrupter, consistent with the present disclosure.
Figure 5E:
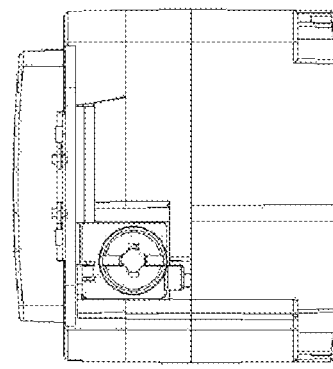
Figure 5D:
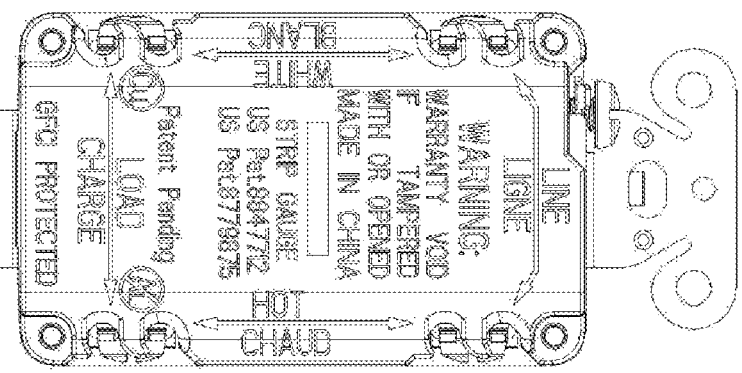
Figure 5C:
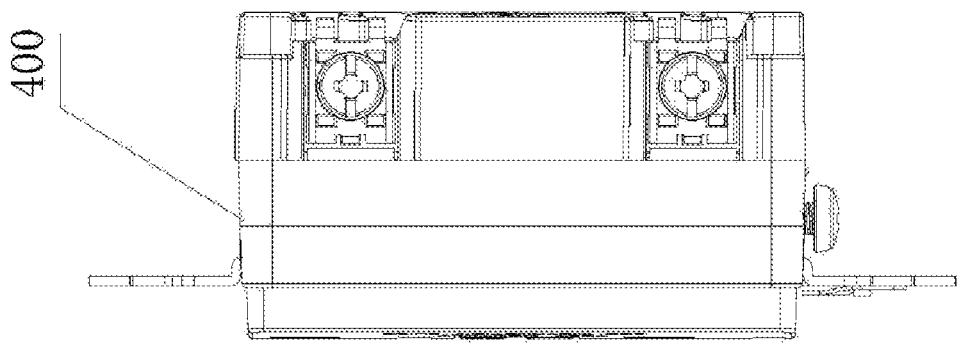
Figure 5B:
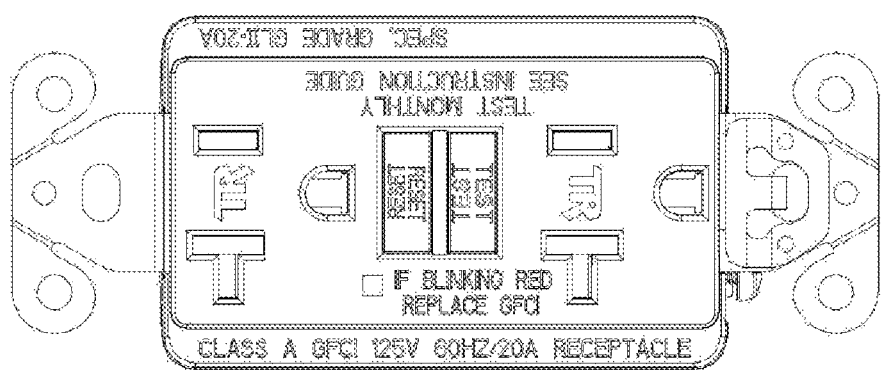
Figure 5F:
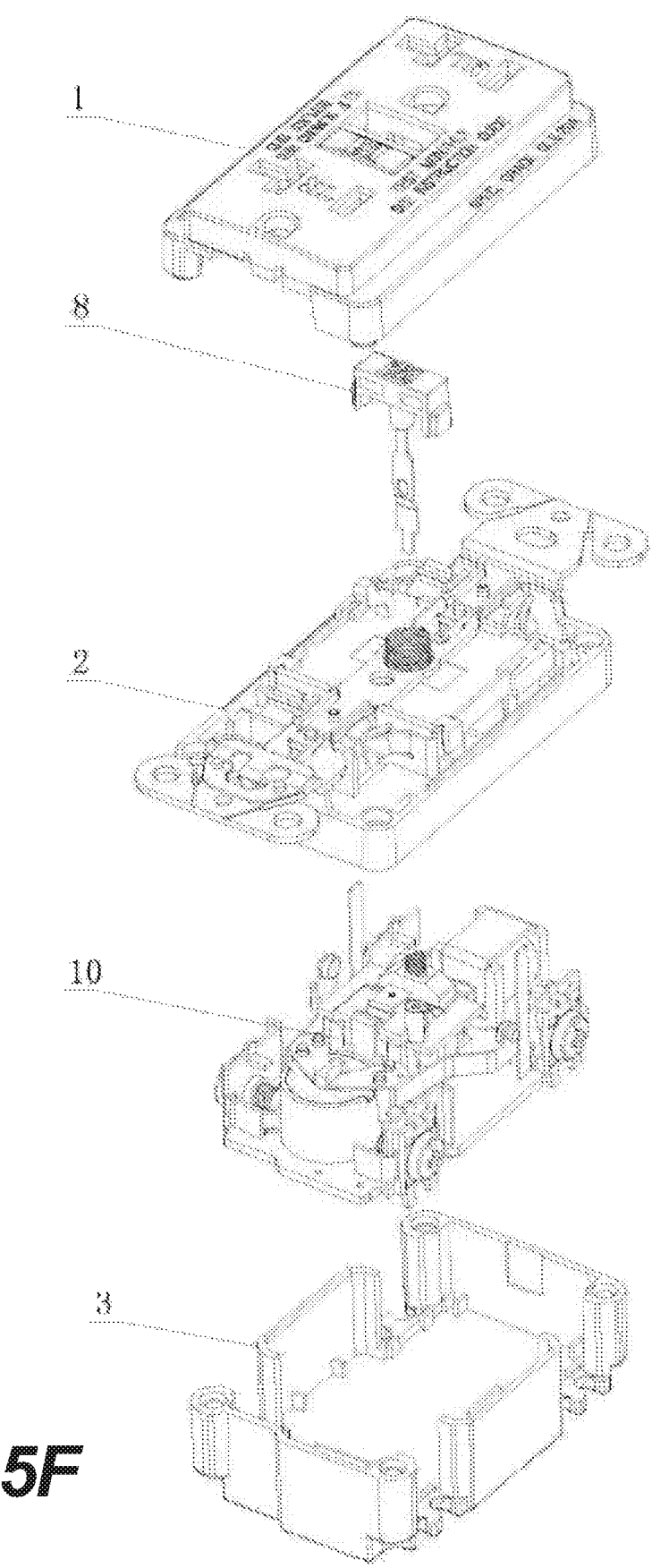
Figure 5G:
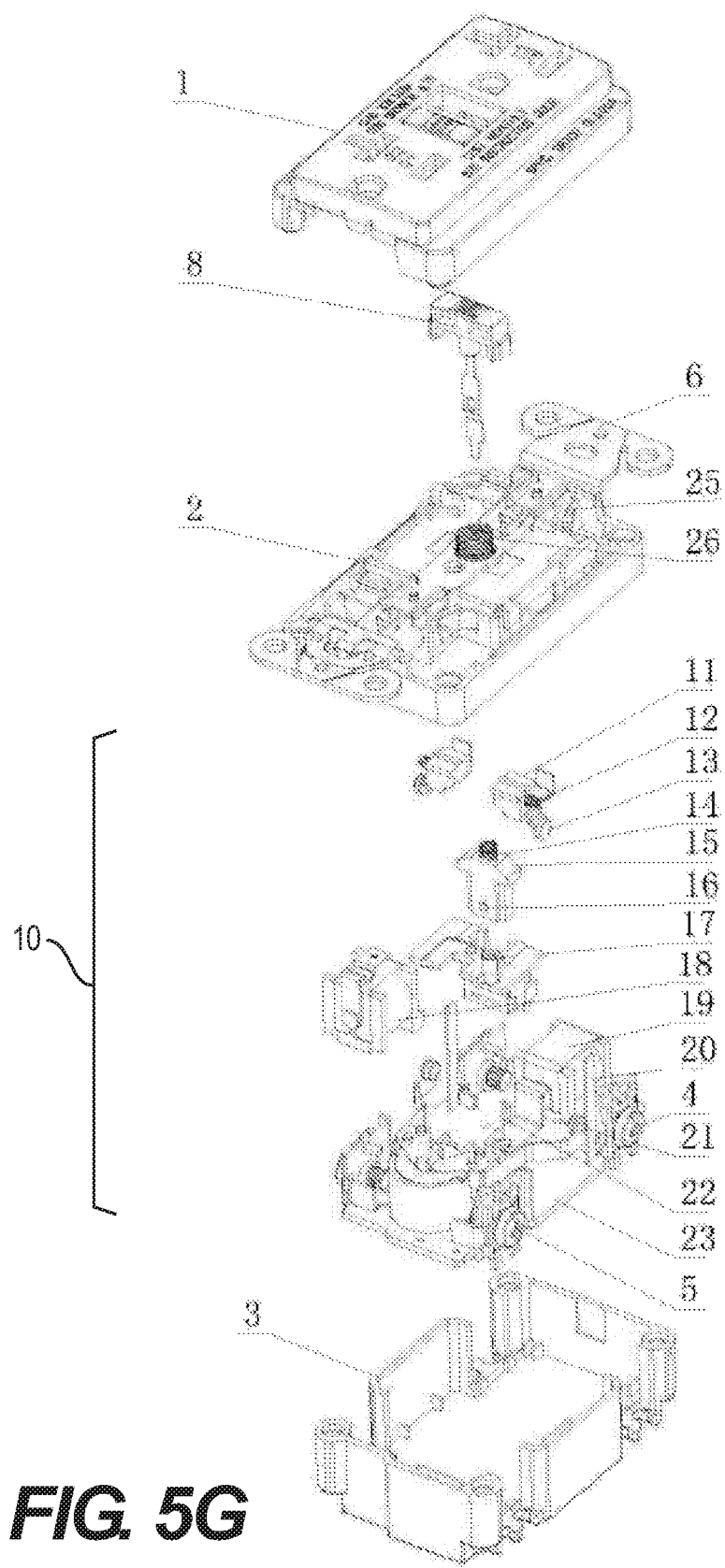
Figure 5J:
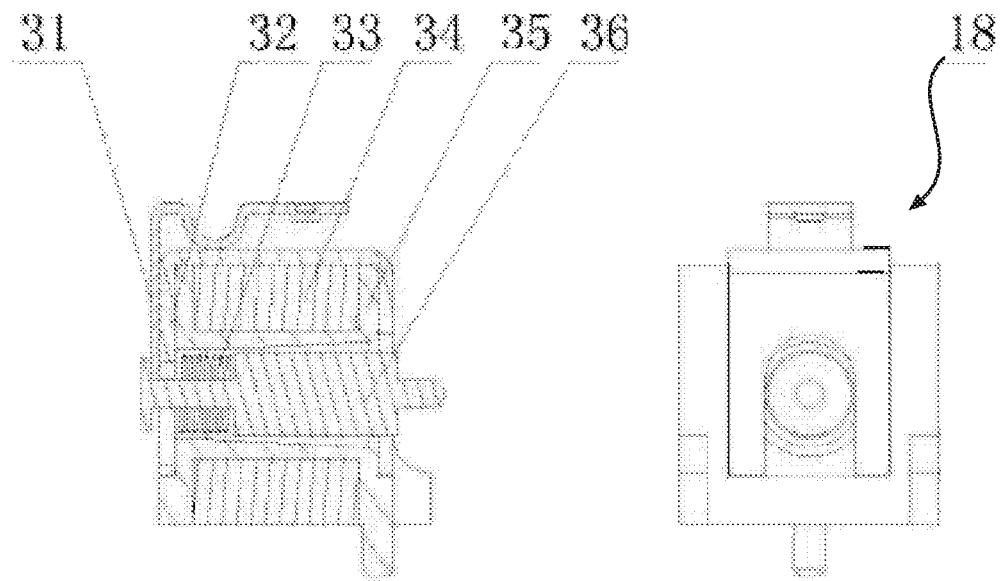
Figure 5J:
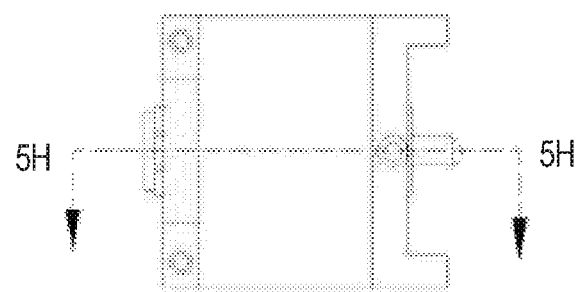
Figure 5O:
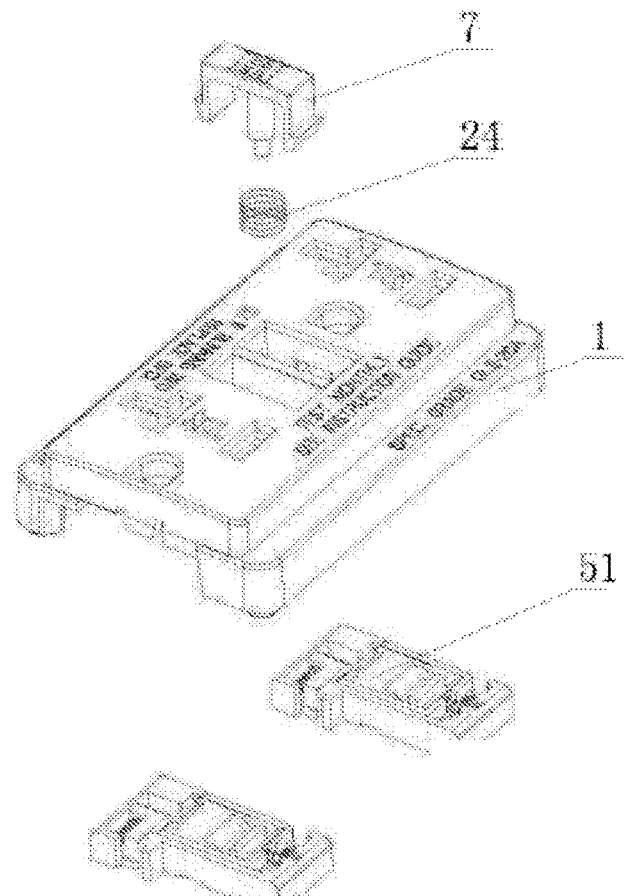
FIGS. 5O and 5P are perspective exploded and perspective cross-sectional views of a front portion of the embodiment of FIGS. 5A-5G, including a safety door assembly.
Figure 5P:
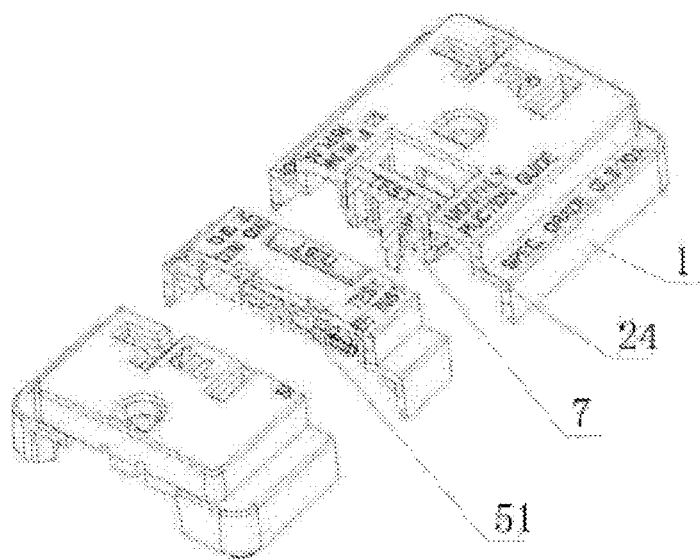
Figure 5Q:
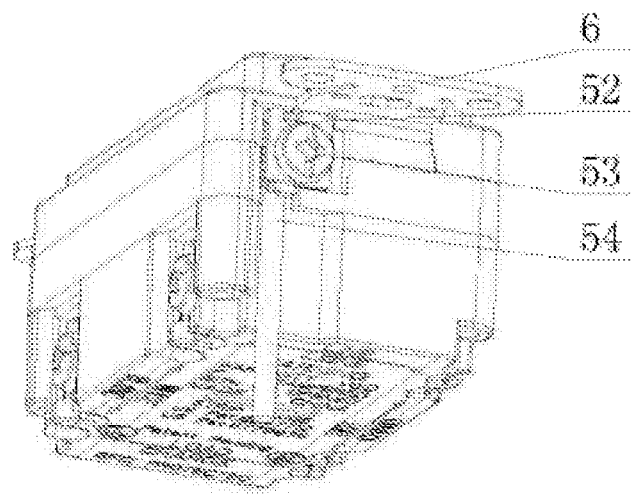
FIG. 5Q is a back perspective view of the embodiment of FIGS. 5A-5G, with a grounding line.
Figure 5R:
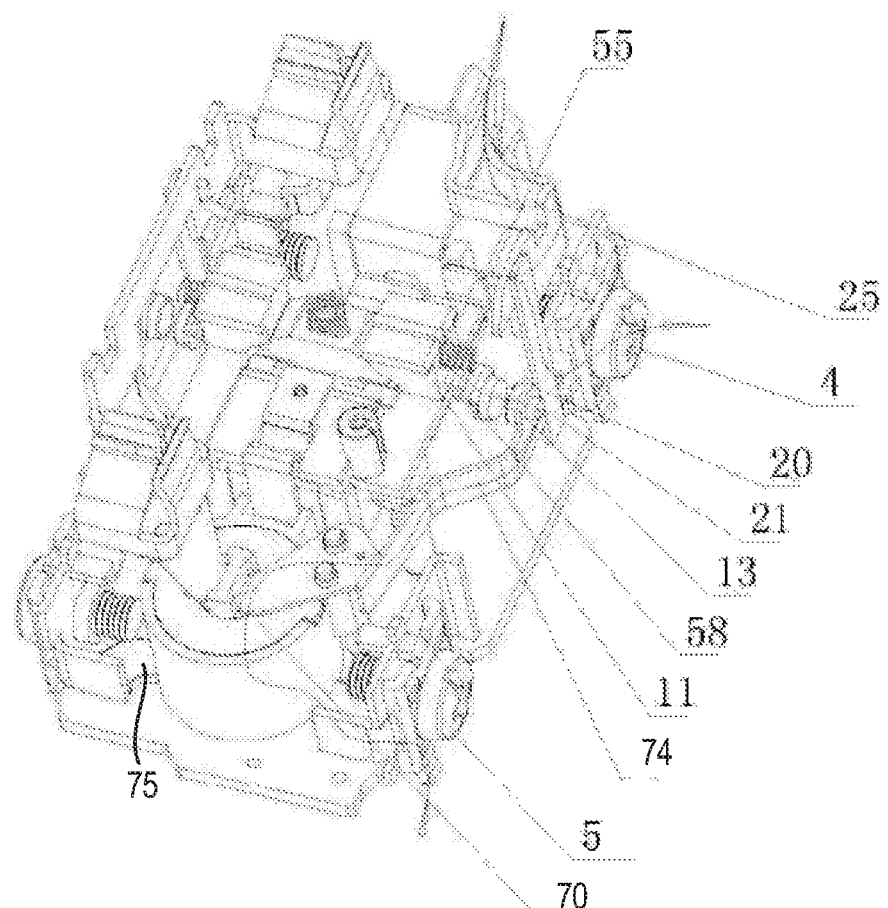
FIG. 5R is a perspective view of a mainboard assembly and other components of the embodiment of FIGS. 5A-5G.

With reference to FIGS. 5A-5R, the physical structure and mechanisms of an embodiment of HCI outlet 400 containing HCI circuitry 300 is discussed. Although HCI outlet 400 is discussed in detail as an example, HCI circuitry 300 and other technologies disclosed herein may be adapted for use in HCI circuit breakers in other forms and configurations, as would be understood by persons of skill in the art.

With reference to FIG. 5A, which is a perspective view of an uninstalled HCI outlet 400, the outlet may comprise face casing 1, middle casing 2, bottom casing 3, output connector assembly 4, input connector assembly 5 to connect to the input line, and ground iron piece 6 to be grounded. Face casing 1 may provide access to electrical jacks 9, reset button 47, and test button 7. FIGS. 5B-5E provide additional views of uninstalled HCI outlet 400.

FIG. 5F provides an exploded view of HCI outlet 400, which further depicts mainboard assembly 10, which is disposed between and is substantially enclosed by middle frame 2 and bottom casing 3. FIG. 5F also depicts reset button assembly 8.

FIG. 5G provides a further exploded view of HCI outlet 400. As depicted, middle frame 2 may contain ground iron piece 6 and static middle frame element 25. Reset spring 26, which may engage with reset button assembly 8, may be disposed upon middle frame 2. Mainboard assembly 10 may include sliding bars 11, sliding bar springs 12, sliding bar movable contacts 13, slider 15, slider spring 14, slider linking hole 16, and reset device seat 17, which may engage with each other to facilitate tripping and resetting of HCI 400. Further, mainboard assembly 10 may include trip coil assembly 18, reset blocking coil assembly 19, reset blocking conductive element 20, input static contact 21, test resistor 22, main board 23, output connector assembly 4, and input connector assembly 5.

FIGS. 5H-5J provide additional detail of trip coil assembly 18 via cross-sectional side, back, and bottom views respectively (with reference to positioning in FIG. 5G). Trip coil assembly 18 may include trip mechanism arm 31, trip iron core spring 33, trip coil 34, trip coil frame 35, trip attraction plate 32, and trip iron core 36.

FIGS. 5K-5M provide additional detail of reset blocking coil assembly 19 via cross-sectional side, back, and top views, respectively (with reference to positioning in FIG. 5G). Reset blocking coil assembly 19 may include reset blocking steel piece 41, reset blocking attraction plate 42, reset blocking iron core 43, reset blocking frame 44, reset blocking housing 45, and reset blocking spring 46. Reset blocking steel piece 41 may include reset guide hole 38 that includes reset blocking portion 37. Although reset blocking steel piece 41 is preferable comprised of steel, it is contemplated that this element may be comprised of other materials, including metals or other materials known in the art.

FIG. 5N provides additional detail of reset button assembly 8 via a perspective view. Reset button assembly 8 may comprise reset button 47, and reset rod 48 with reset rod locking hole 49 and reset rod blocking shoulder 50.

FIG. 5O depicts a perspective exploded view of face casing 1, test button 7, test button spring 34, and safety door assemblies 51. Safety door assemblies 51 may default to a closed position to prevent water, dust, or foreign objects from entering the jacks of HCI outlet 400. When contacted by a plug from an electrical appliance, safety door assemblies 51 may move to the side allow the plug to be inserted. Its purpose is to not allow dust or water from getting into the copper contacts. FIG. 5P depicts a perspective, assembled view of the elements depicted in FIG. 5O, that further includes cross sections to illustrate the assembly.

FIG. 5Q is a back perspective view of the embodiment of HCI outlet 400 connected to a grounding line 54 via dual purpose clamp 52 and grounding screw 53, that also depicts with a grounding line. Dual purpose clamp 52 may serve to both provide a ground point and clamp the ground wire during installation.

FIG. 5R provides additional detail of mainboard assembly 10 and other components via a perspective view. As shown, HCI outlet 400 may additionally include coil housing 70, coil assembly input conductors 75, and coil assembly output conductors 74. Each coil assembly output conductor 74 may connect to an input static contact 21. HCI outlet 400 may further include sliding bar movable contact 58, which may be disposed on sliding bar 11. HCI outlet 400 may further include connecting line 55, which is configured to conduct electricity from sliding bar movable contact 58 to jack 9 through static middle frame element 25. Connecting line 55 may also be configured to conduct electricity from sliding bar movable contact 58 to output connector assembly 4 through reset blocking conductive element 20.

With reference to FIGS. 6A-6J, certain operations of an embodiment of HCI 100 are described.

Figure 6A:
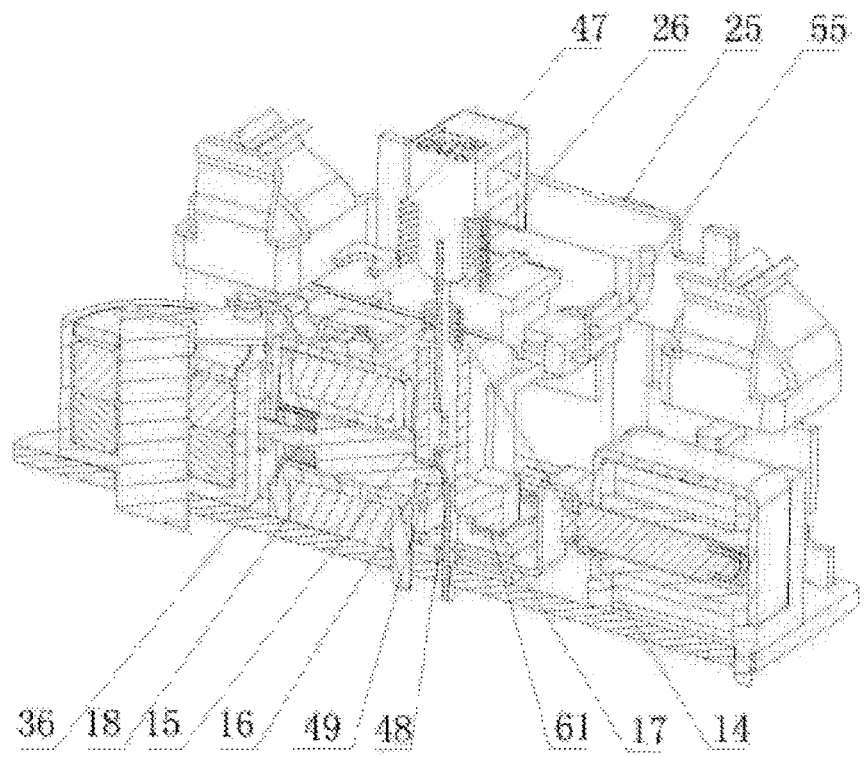
FIGS. 6A-6J are cross-sectional perspective views of the embodiment of FIGS. 5A-5G that illustrate various device states, consistent with the present disclosure.
Figure 6B:
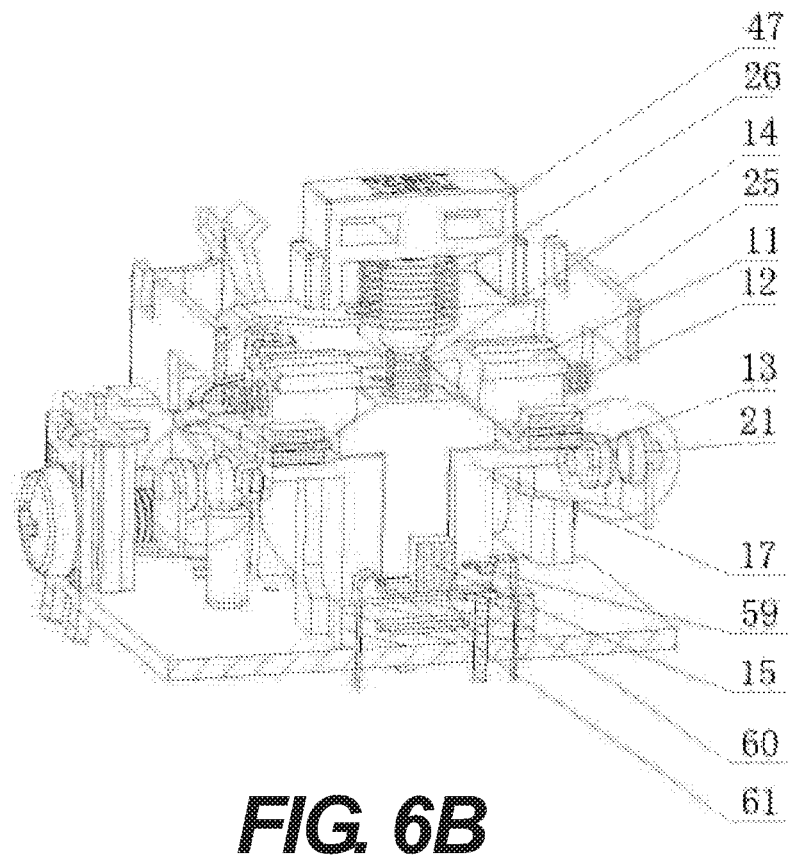
Figure 6C:
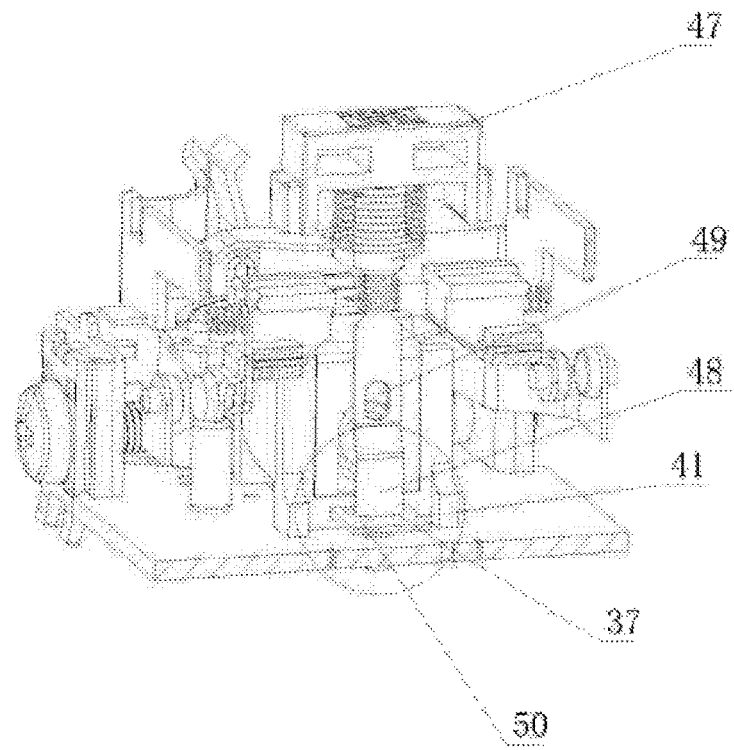

FIG. 6A-6C are cross-sectional views of components of HCI outlet 400. This figure illustrates the initial, tripped, non-conductive state of an exemplary HCI outlet 100. Reset rod 48 is positioned within reset blocking portion 37 of reset guide hole 38 of reset blocking steel piece 41 of the reset blocking coil assembly 19. As shown, reset rod blocking shoulder 50 of reset rod 48 abuts the top surface of reset blocking steel piece 41. Due to force exerted by reset spring 26, the reset button 47 is in its top position, wherein it is fully extended towards and may be at least partially extended through face casing 1 (not shown). The tip of trip iron core 36 is positioned within slider linking hole 16 of slider 15 and preferably abuts preferably abuts an inclined portion of reset rod 48, just below reset rod linking hole 49. Slider 15 is maintained at the bottom of reset device seat 17. In this position, slider 15 presses switch bridge 61, causing it to connect with K1 switch 60 contact, and maintaining the K1 switch in a closed position. Due to the force of sliding bar springs 12, sliding bars 11 are each located at an inner position. Sliding bar movable contacts 13 are attached to each of the sliding bars 11, respectively. As such, when sliding bars 10 are located at their inner positions, respectively, input static contacts 21 are separated from their corresponding sliding bar movable contacts 13. This separation maintains a non-conductive state of HCI outlet 400 and prevents the supply of electric power through jacks 9 and to output connector assembly 4.

Figure 6D:
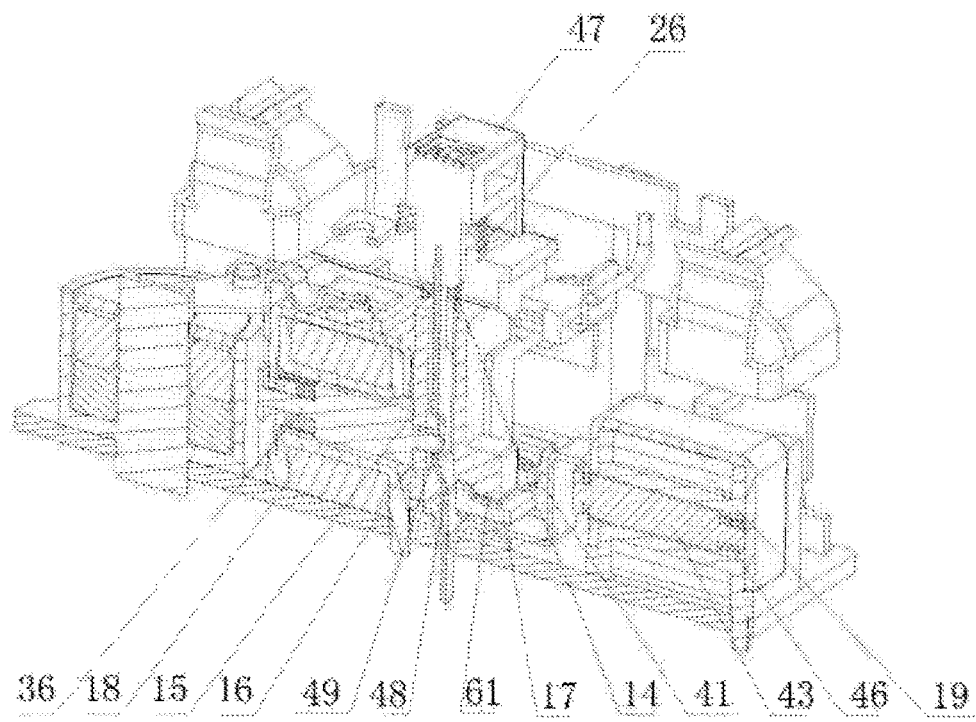
Figure 6E:
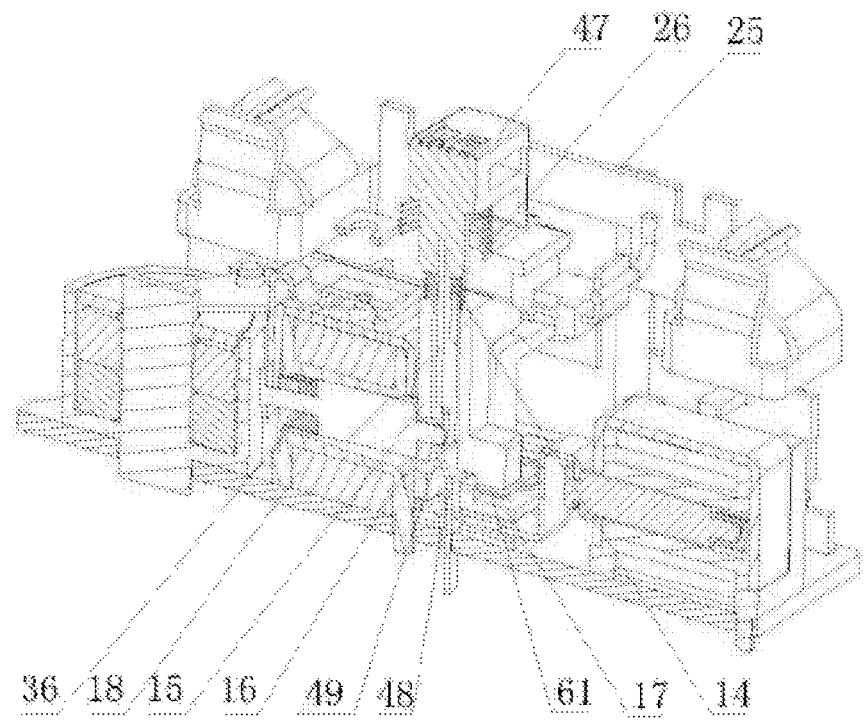
Figure 6F:
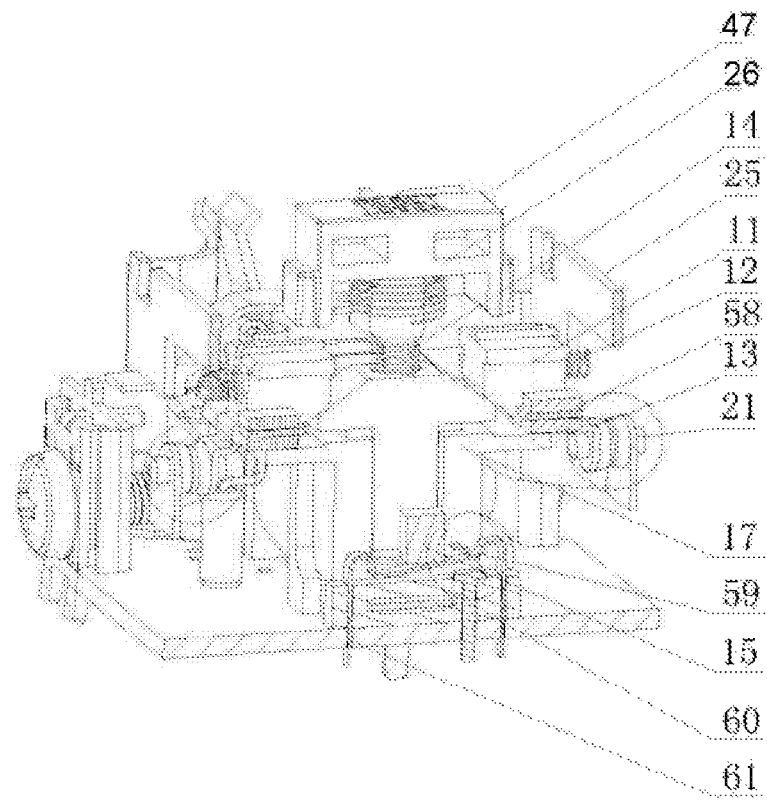

FIG. 6D-6F are cross-sectional views of components of HCI outlet 400 that illustrate the reset activation process in the circumstance where HCI outlet 400 is wired correctly. As shown in FIG. 6D, when HCI outlet 400 is wired correctly, the MCU causes reset blocking iron core 43 of the reset blocking coil assembly 19 to withdraw. In turn, this causes reset blocking steel piece 41 to pull back, permitting reset rod blocking shoulders 50 to pass through reset guide hole 38 of reset blocking steel piece 41. Then, when reset button 47 is manually pressed sufficiently to overcome the force of reset spring 26, reset button assembly 8, including reset rod 48, moves downward, bringing reset rod locking hole 49 into substantial alignment with trip iron core 36. Thus, due to force exerted by trip iron core spring 33, the tip of trip iron core 36 slides into reset rod locking hole 49.

As shown in FIGS. 6E and 6F, after reset button 47 is released, reset spring 26 pushes reset assembly 8 back into its top position. As shown, due to the engagement of the trip iron core 36 with both reset rod locking hole 49 and slider linking hole 16 of slider 15, slider 15 is brought upward into a top position along with reset button assembly 8. Through such movement, slider 15 disconnects switch bridge 61 and K1 switch contact 60, thereby leaving K1 switch open, where it is maintained. At the same time, the slider 15 movement connects switch bridge 61 and K2 switch contact 62, thereby closing switch K2. Further, as a result of slider 15 movement, the inclined faces of slider 15 exert pressure on the corresponding inclined faces of sliding bars 11. In turn, the sliding bars 11 are pushed outward toward the sides of HCI outlet 400, compressing their respective sliding bar springs 12. Ultimately, this outward movement causes sliding bar movable contacts 13 to respectively contact corresponding input static contacts 21. Upon such contact, HCI outlet 400 may be placed in an "on" or reset state. That is, electric power may be provided through jacks 9 as well as to output connector assembly 4.

HCI circuitry 300, as shown in FIG. 3 depicts HCI 400 in a trip position. As noted above, pressing the reset button opens the K1 switch. Provided that the unit is not in an EOL state, which may govern the signal at TRIG from the MCU, this may complete the circuit and energize solenoid T2. By energizing solenoid T2, the reset blocking iron core 43 is pulled back. Consequently, solenoid T1's plunger may be inserted into reset rod locking hole 49. Further, when K2 switch is closed, via the connection between switch bridge 61 and K2 switch contact 62, a signal at MCU_V_ADC informs the MCU that reset has been completed.

If, however, HCI is in an EOL state, solenoid T2 cannot be energized regardless of whether the K1 switch is opened, and resetting cannot occur.

Figure 6G:
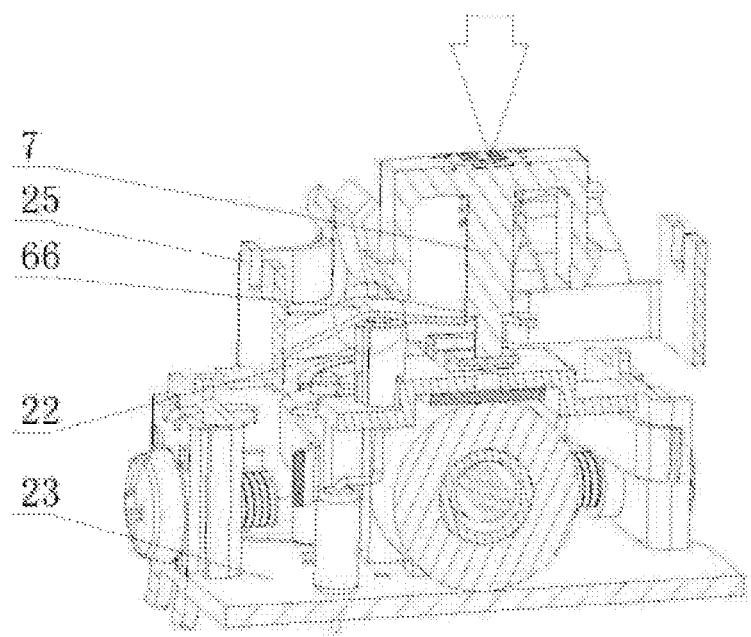
Figure 6H:
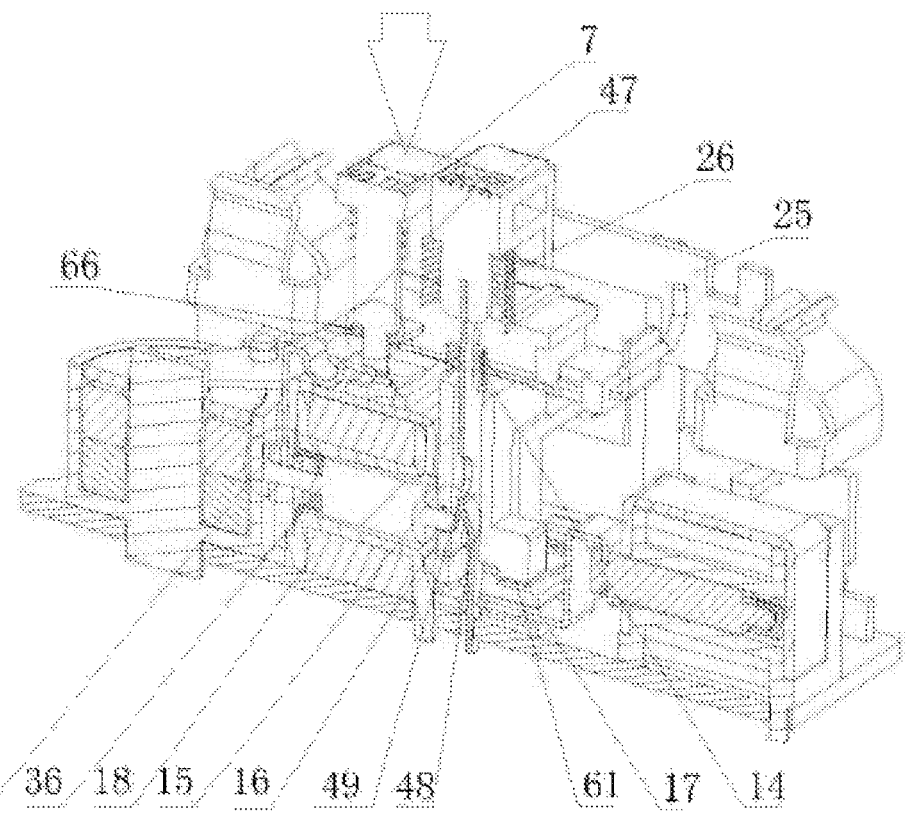

FIGS. 6G and 6H are cross-sectional views of HCI outlet 400 and components thereof, respectively, that illustrate a tripping operation resulting from a manual test to ensure a proper fault response. To test the tripping functionality of HCI outlet 400, a user may press the test button 7 to cause test conducting element 66, which is electrically connected to static middle frame element 25, to electrically contact test resistor 22. Because test resistor 22 (shown as R9 in FIG. 3) is electrically connected to Live line, this causes MCU to provide a signal at MCU SIMULATION to induce a simulated leakage current. Via processing operations described herein, HCI circuitry 100 may register the simulated leakage current as a leakage fault and ultimately cause HCI 400 to trip.

Trip coil assembly 18 may be configured to receive the trigger signal provided at TRIG1. As show in FIG. 6H, the trigger signal, when received by trip coil assembly 18, ultimately creates an electromagnetic force that causes trip iron core 36 to retract against the force of trip iron core spring 33. As a result, the tip of trip iron core 46 disengages from reset rod locking hole 49, thereby disengaging slider 15 from reset button assembly 8. In turn, this permits reset button assembly 8 to move upward under the force of reset spring 26 and causes slider 15 to move to the bottom of reset device seat 17 under pressure of slider spring 14. In turn, slider 15 pushes on switch bridge 61, disconnecting it from K2 switch contact 59, opening the K2 switch, and connecting switch bridge 61 with K1 switch contact 60, connecting it. Further, sliding bars 11 and their respective sliding bar movable contacts 13 return to their inner positions under the force of sliding bar springs 12, which separates sliding bar movable contacts 13 from input static contacts 21. This places HCI outlet 400 in a trip state, halting the supply of power to jacks 9 and to output connector assembly 4.

The triggering process discussed in the preceding paragraph may also be initiated when MCU provides a trigger signal at TRIG1 in response to determining the presence of an electrical fault occurrence.

Further, in alternative embodiments, a trigger signal may be delivered as a result of a different type of fault, or in response to a remote command.

Figure 6I:
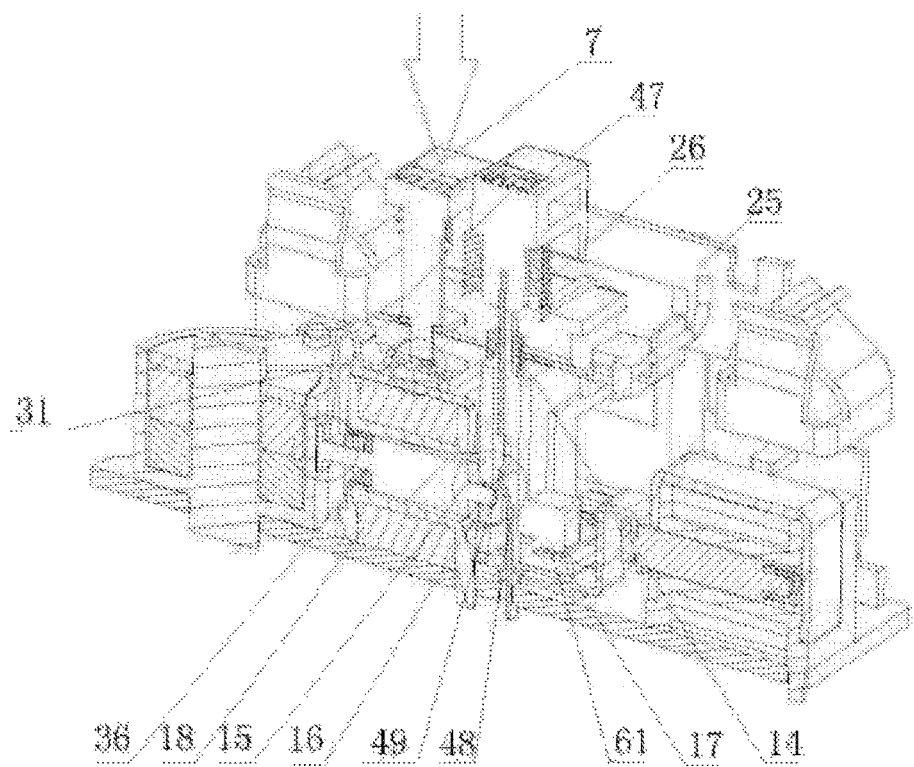

Tripping by manually pressing test button 7 may be possible through a fully mechanical process and, as such, may occur even in the absence of electricity. As shown in FIG. 6I, test button 7 may be fully pressed to the bottom of its stoke range. Here, the bottom portion of test button 7 may exert force on one end of trip mechanical arm 31 of trip coil assembly 18, causing trip mechanical arm 31 to pivot about its fulcrum and mechanically pull back trip iron core 36. In turn, this may cause the tip of trip iron core 36 to disengage from reset rod locking hole 49, thereby disengaging slider 15 from reset button assembly 8, permitting reset button assembly 8 to move upward under the force of reset spring 28 and permitting slider 15 to move to the bottom of reset device seat 17 under pressure of slider spring 14. Slider 15 may then press on switch bridge 61, disconnecting it from K2 switch contact 59 and connecting it to K1 switch contact 60. In turn, sliding bars 11 and their respective sliding bar movable contacts 13 may return to their inner positions under the force of sliding bar springs 12, which separates sliding bar movable contacts 13 from input static contacts 23, preventing the supply of power to jacks 9 and output connector assembly 4.

Figure 6J:
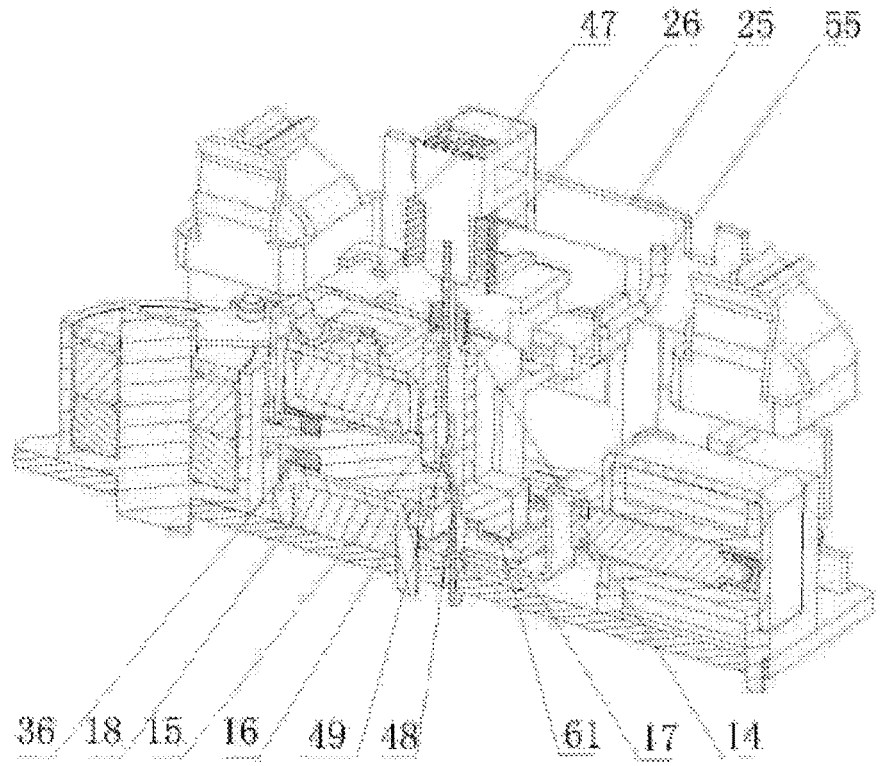

FIGS. 6J and 6C are cross-sectional views of components of HCI outlet 400 that illustrate entry into an locked state, whereby outlet 400 may be placed in a permanent or semi-permanent tripped, non-conductive state. As shown in FIG. 6J, upon determining that HCI 400 should be placed in an locked state, MCU may provide a trigger signal, for example at TRIG, that creates an electromagnetic force that causes trip iron core 36 to retract against the force of trip iron core spring 33. This may ultimately place HCI outlet 400 into a tripped state in a manner identical or similar to that discussed above.

As shown in FIG. 6C, simultaneously or subsequently to proving the trip signal, MCU may provide a locking signal at TRIG of MCU. Receipt of this locking may cause reset blocking coil assembly 19 to extend reset blocking steel piece 41 such that reset rod 48 is aligned with the reset blocking portion 37 of reset guide hole 38. In this manner, reset rod blocking shoulder 50 abuts the top surface of reset blocking steel piece 41, preventing any future downward movement of reset rod 48, and thus preventing HCI outlet 400 from entering a reset state. After receipt of the locking signal from the control circuit, reset blocking coil assembly 19 may be physically unable to retract reset blocking steel piece 41, thus ensuring that HCI outlet 400 permanently remains tripped. In an EOL state, MCU may be permanently disabled from providing a signal at TRIG that may reverse the locking mechanism.

Figure 7A:
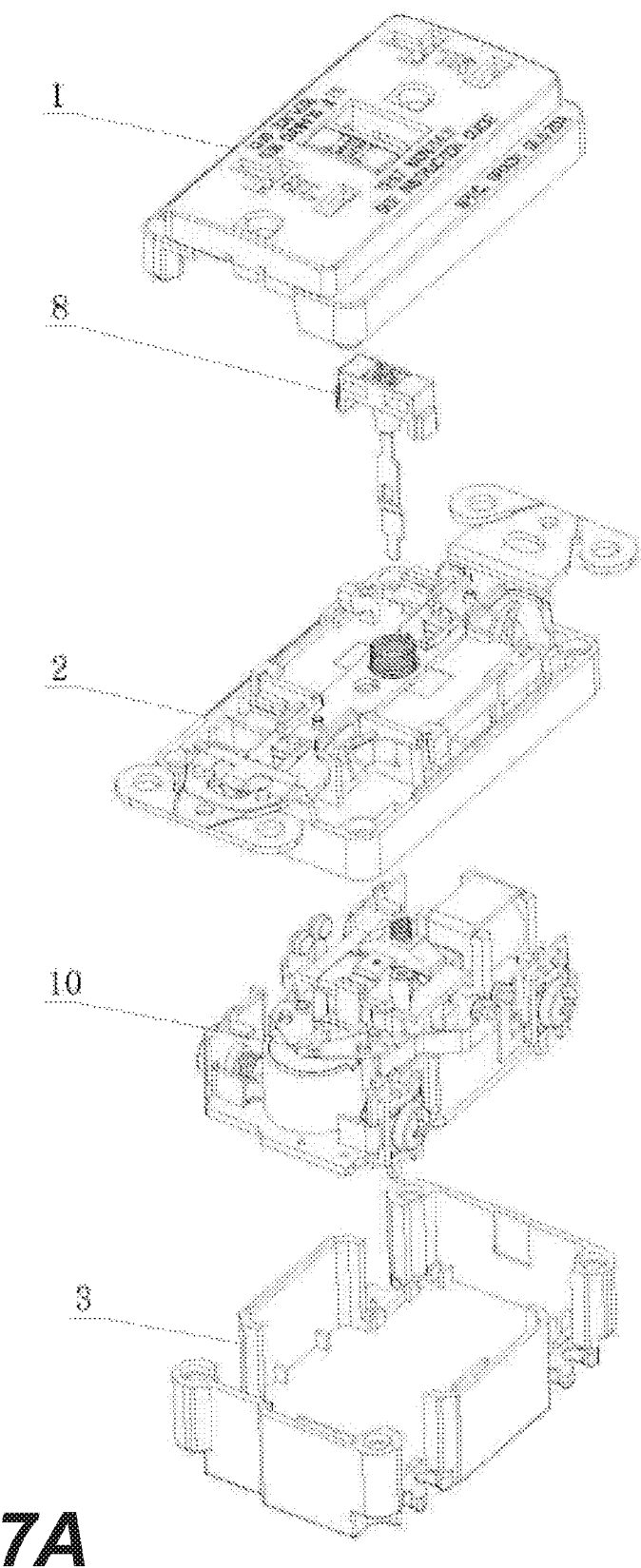
FIGS. 7A and 7B are exploded and exploded perspective views of another embodiment of a hybrid circuit interrupter, consistent with the present disclosure.
Figure 7B:
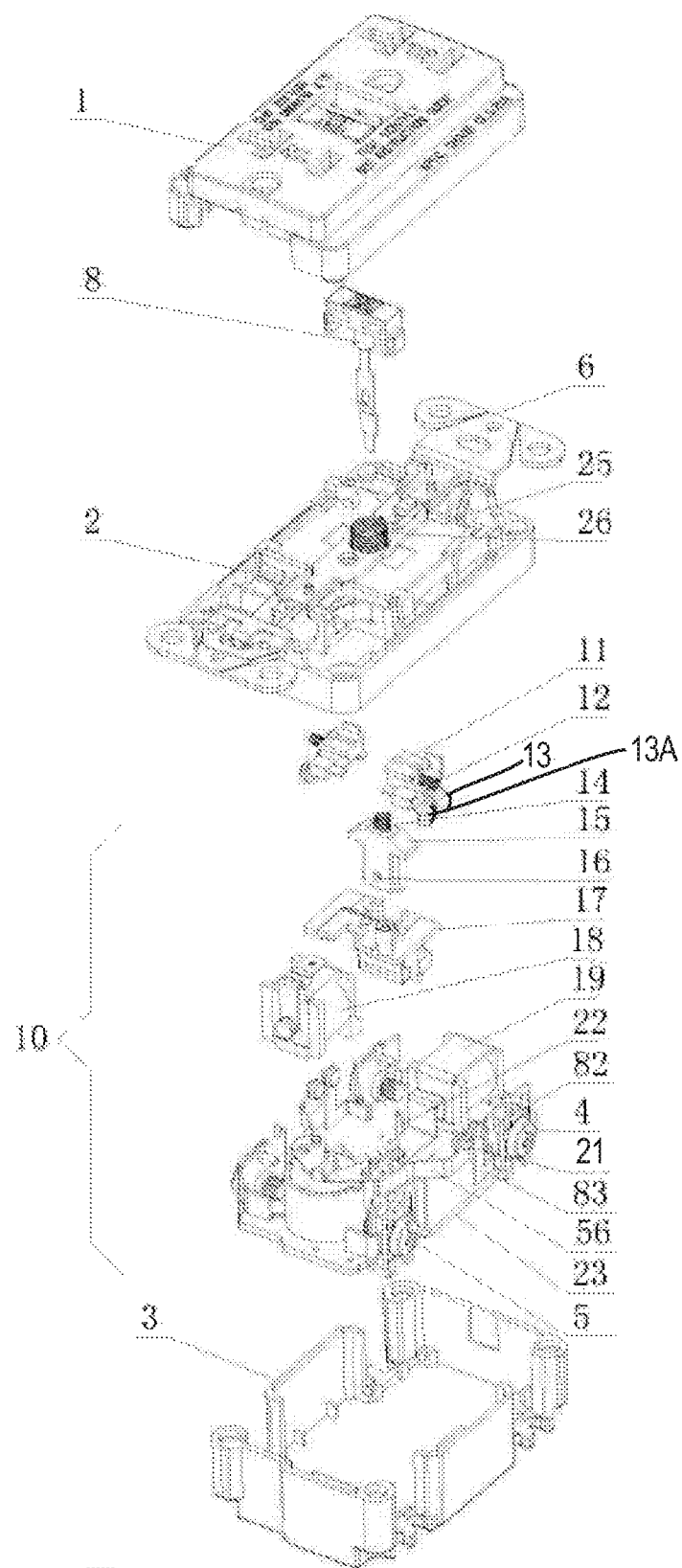
Figure 7C:
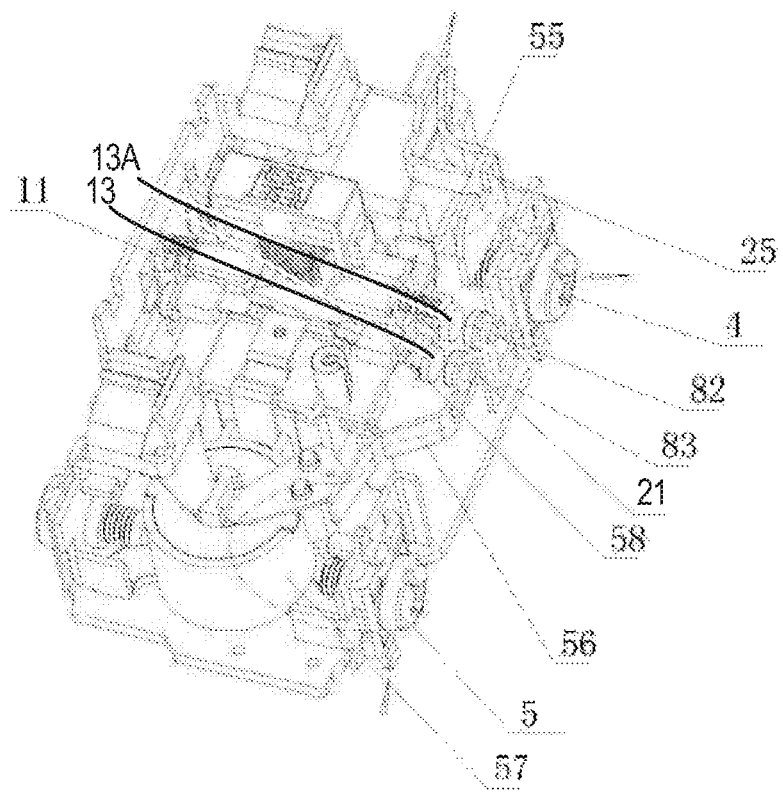
FIG. 7C is a perspective view of a mainboard assembly and other components of the embodiment of FIGS. 7A-7B.

With reference to FIGS. 7A-7C, the physical structure of an alternative embodiment of a HCI 400 outlet containing HCI circuitry 300 is depicted. This embodiment is similar to that depicted in FIGS. 5A-5O. However, in this embodiment, each sliding bar 12 may have a pair of corresponding sliding bar movable contacts 13, 13A. Additionally, HCI 400 outlet may include output static contact 82, which may be aligned to contact movable contact 31. It may further include output static contact connector 83 that electronically connects output static contact 82 with output connector assembly 4.

With reference to FIGS. 8A-8I, certain operations of the embodiment of HCI 100 depicted in FIGS. 7A-7C are described. Such operation may be substantially similar to the operations described above with respect to FIGS. 6A-6J.

Figure 8A:
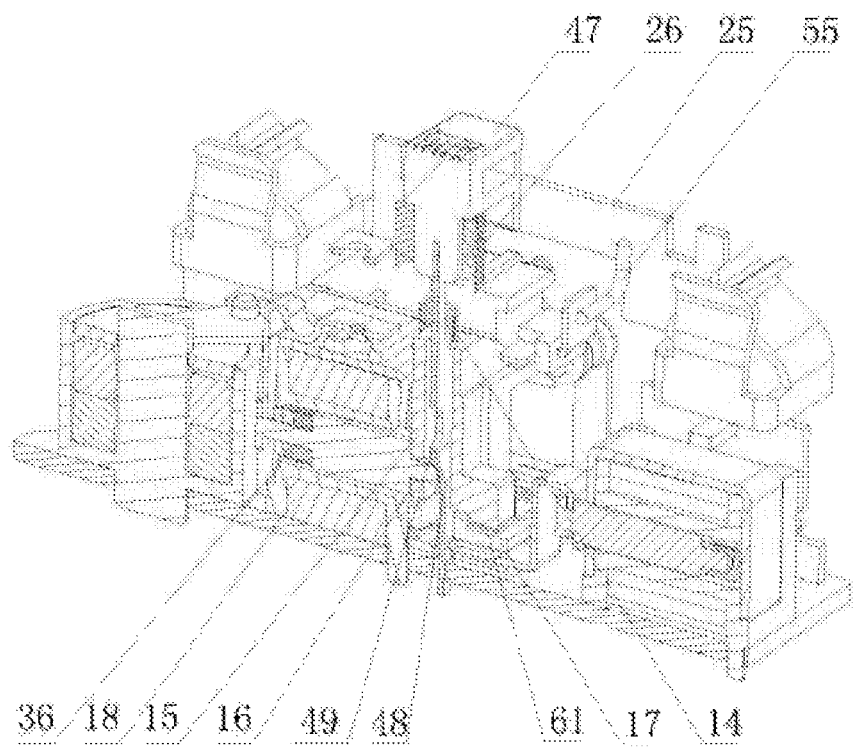
FIGS. 8A-8I are cross-sectional perspective views of the embodiment of FIGS. 7A-7C that illustrate various device states, consistent with the present disclosure.
Figure 8B:
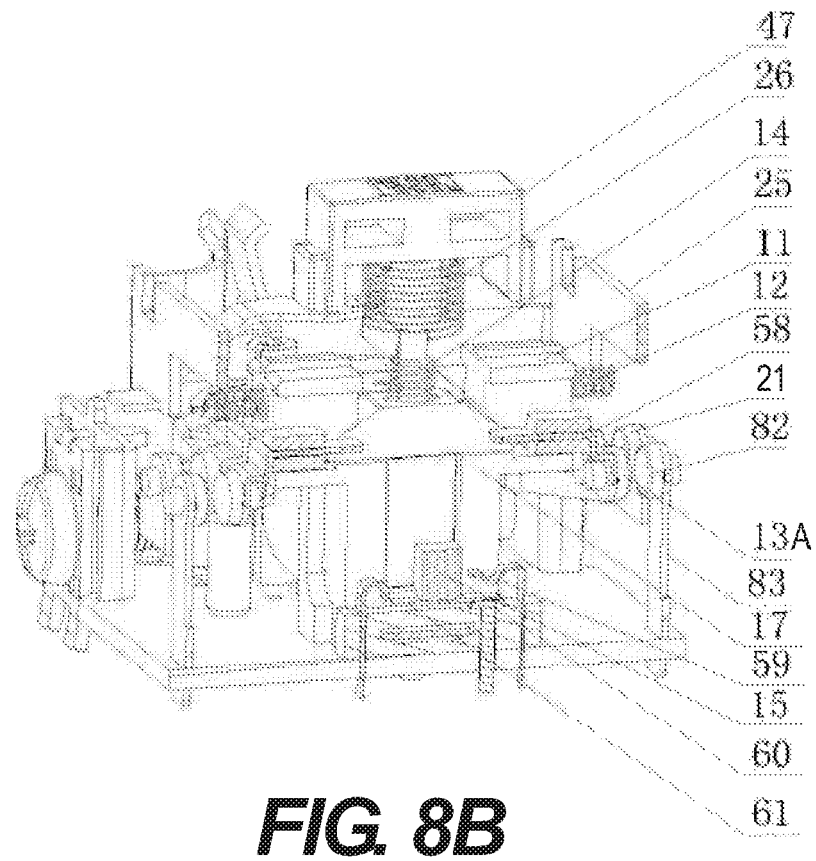
Figure 8C:
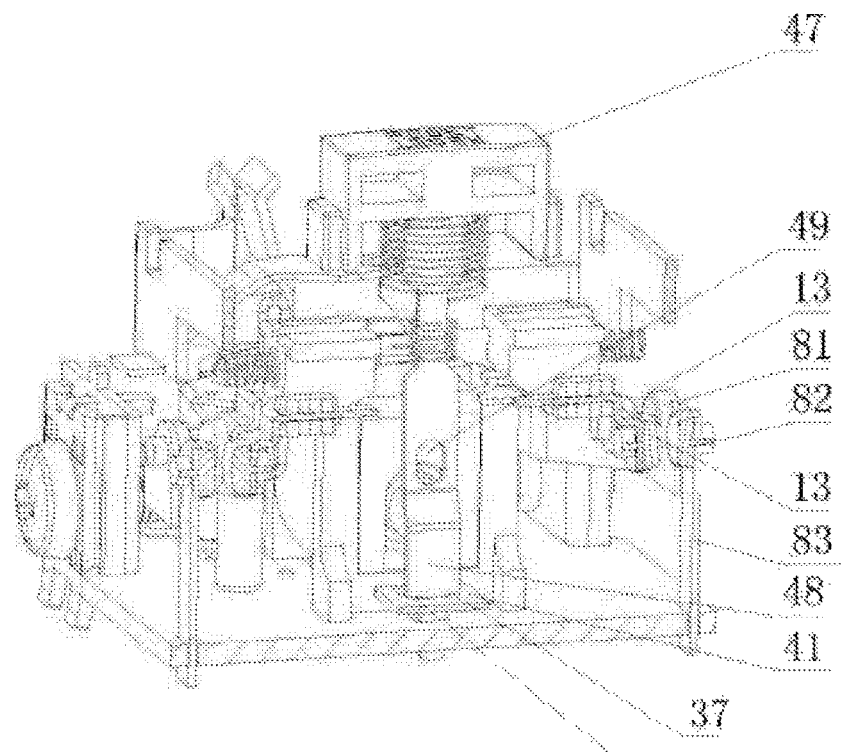

FIG. 8A-8C are cross-sectional views of components of alternative HCI outlet 400. The figures illustrate the initial, tripped, non-conductive state of the HCI outlet 100. The configuration and operation is substantially similar to that discussed with respect to FIGS. 6A-6C, discussed above. However, here, a pair of sliding bar movable contacts 13 and 13A are attached to each of the sliding bars 11, respectively. As such, when sliding bars 10 are located at their inner positions, respectively, input static contacts 21 are separated from their corresponding sliding bar movable contacts 13 and output static contacts 82 are separated from their corresponding sliding bar movable contacts 13A. This separation maintains a non-conductive state of HCI outlet 400 and prevents the supply of electric power through jacks 9 and to output connector assembly 4.

Figure 8D:
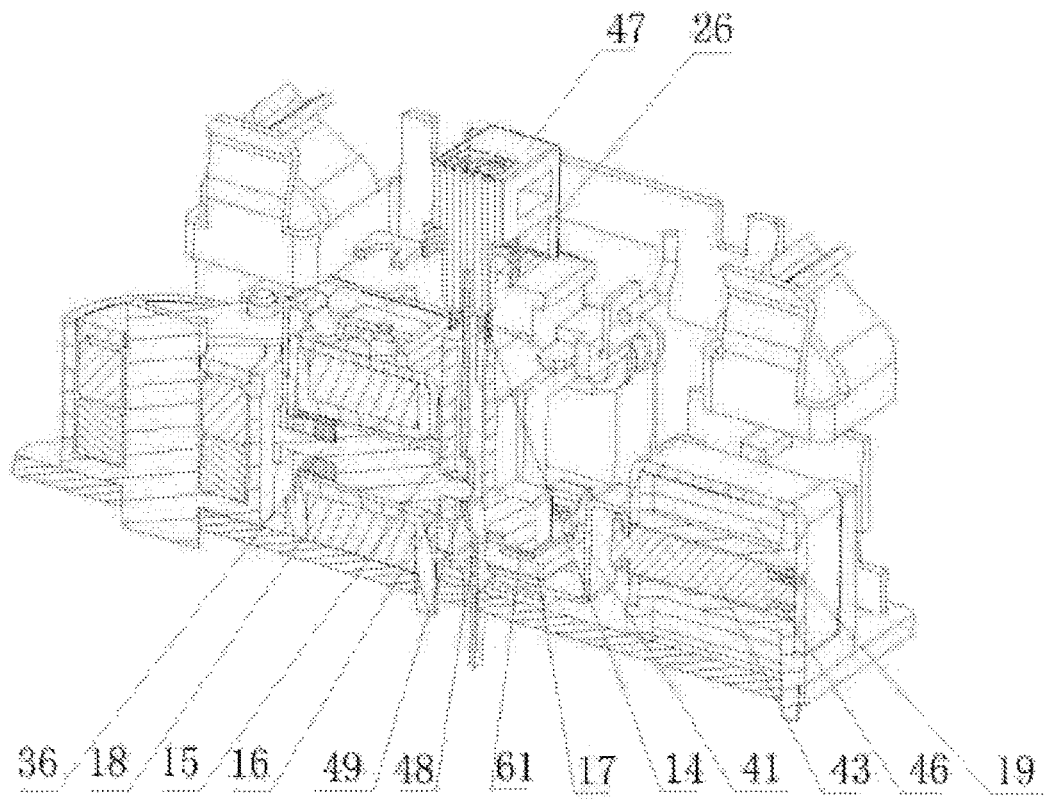
Figure 8E:
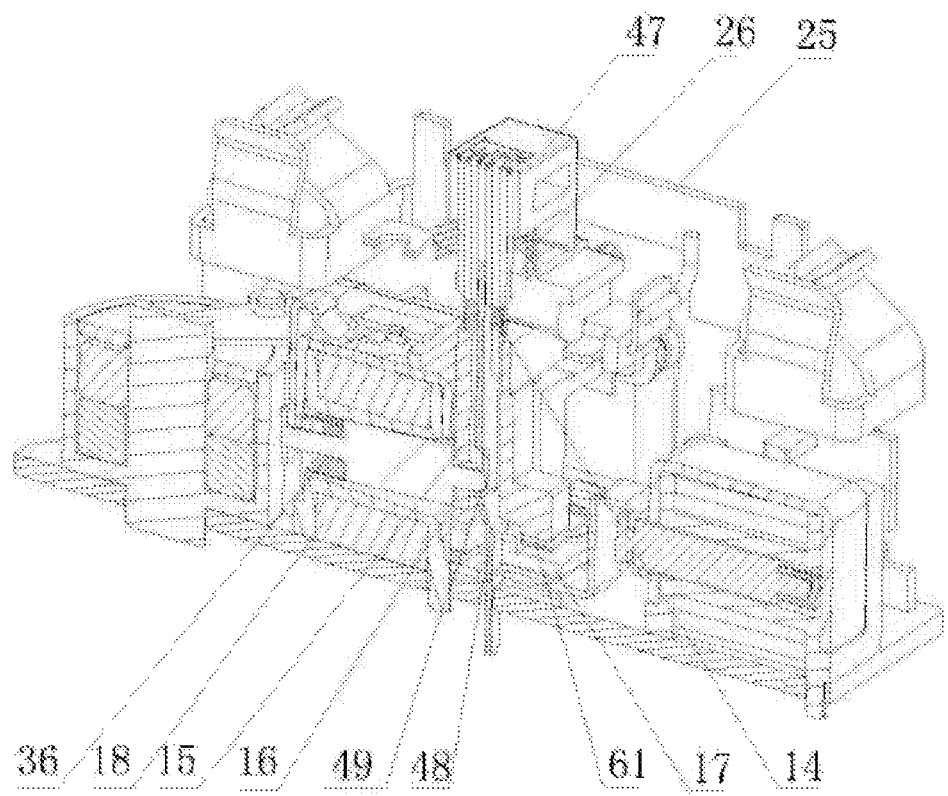
Figure 8F:
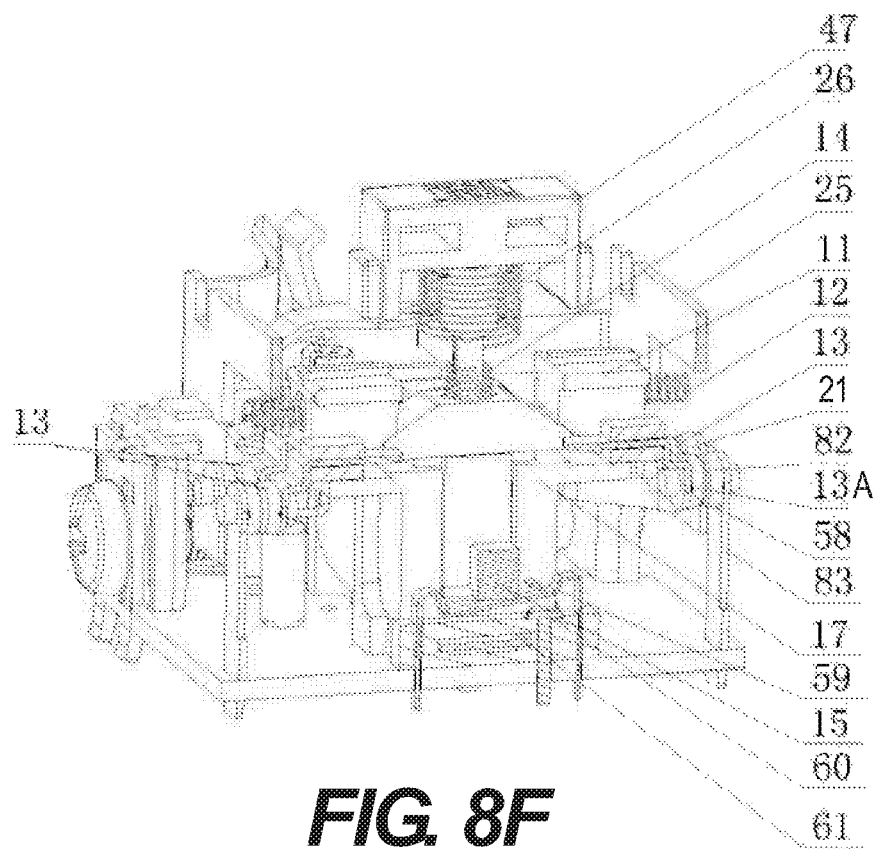

FIG. 8D-8F are cross-sectional views of components of alternative HCI outlet 400 that illustrate the reset activation process in the circumstance where HCI outlet 400 is wired correctly. The configuration and operation is substantially similar to that discussed with respect to FIGS. 6D-6F, above. However, here the outward movement of slider bars 11 causes sliding bar movable contacts 13 and 13A to respectively contact corresponding input static contacts 21 and output static contacts 82. Upon such contact, HCI outlet 400 may be placed in an "on" or reset state.

Figure 8G:
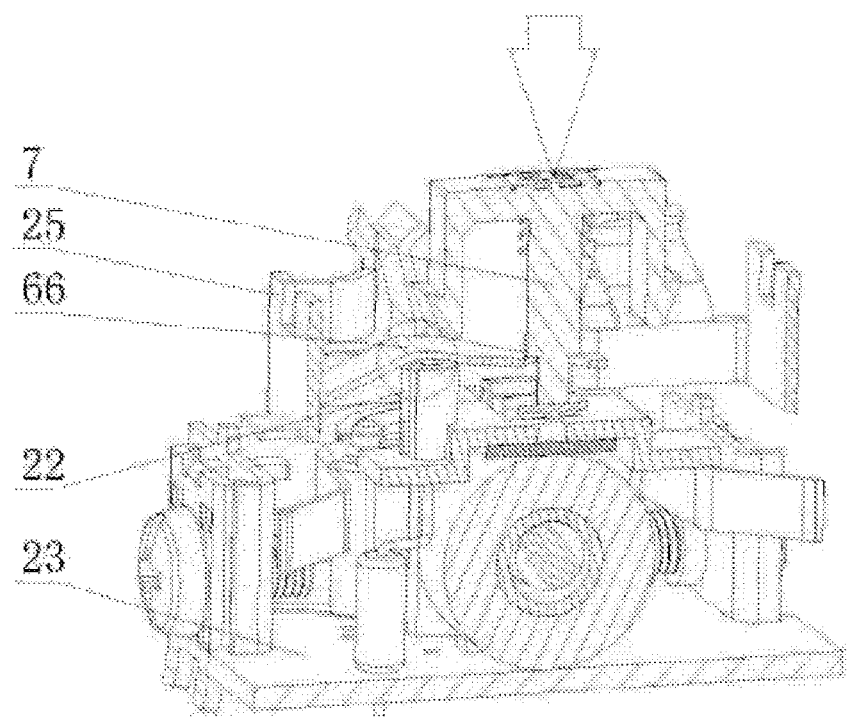

FIG. 8G is a cross-sectional view of alternative HCI outlet 400 and components thereof, respectively, that illustrate a tripping operation resulting from a manual test to ensure a proper fault response. The configuration and operation of this and of tripping due to electrical fault detection is substantially similar to that discussed with respect to FIGS. 6G-6H, above. However, the return of sliding bars 11 to their inner positions separates sliding bar movable contacts 13 from input static contacts 21 and separates sliding bar movable contacts 13A from output static contacts 82. This places HCI outlet 400 in a trip state, halting the supply of power to jacks 9 and to output connector assembly 4.

Figure 8H:
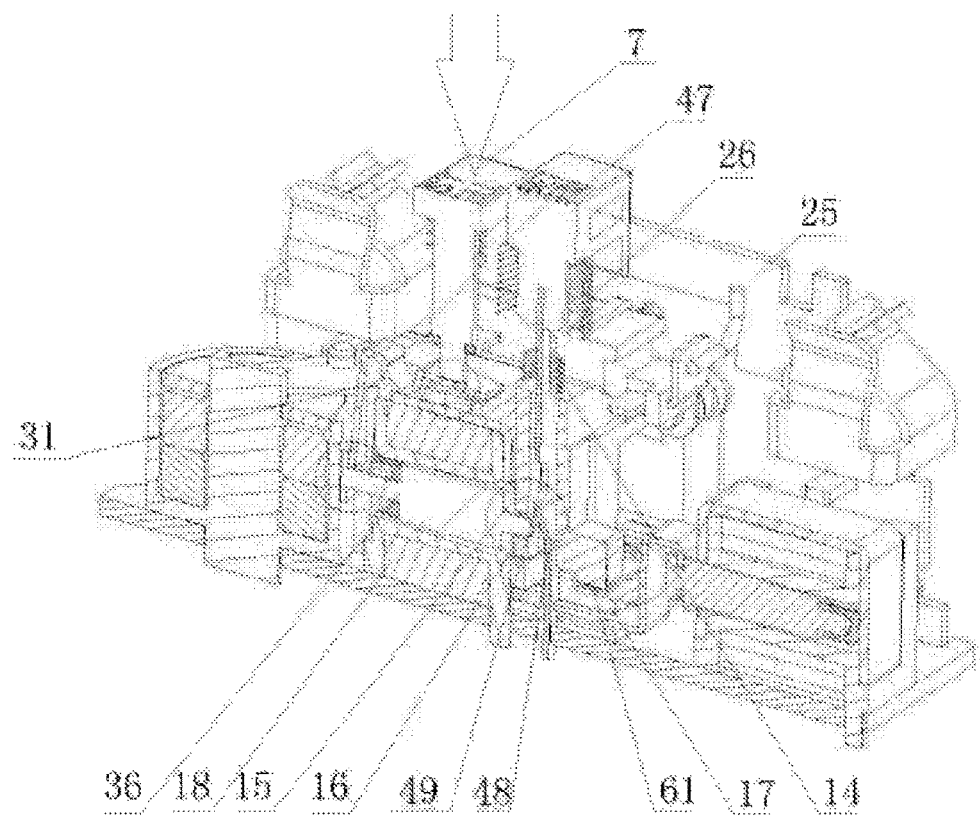

With reference to FIG. 8H, the operation of tripping alternative HCI outlet 400 through a fully mechanical process is substantially similar to that discussed with respect to FIG. 6I, above. However, here, the return of sliding bars 11 to their inner positions separates sliding bar movable contacts 13 from input static contacts 21 and separates sliding bar movable contacts 13A from output static contacts 82. This places HCI outlet 400 in a trip state, halting the supply of power to jacks 9 and to output connector assembly 4.

Figure 8I:
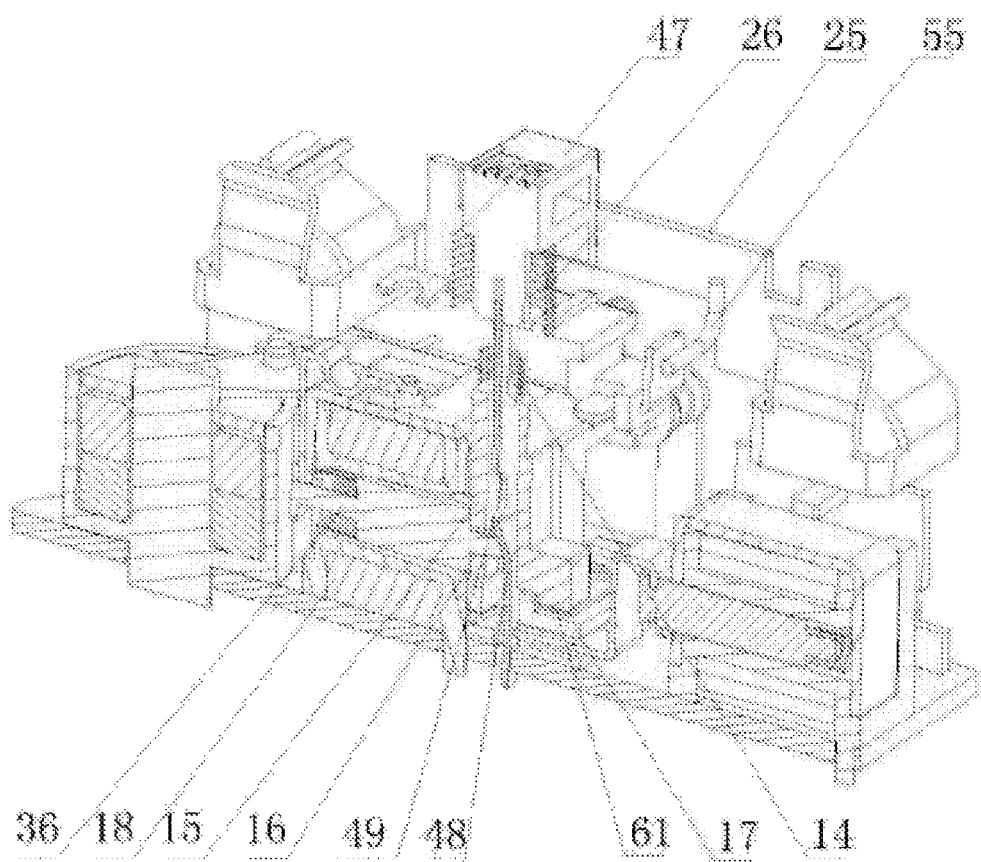

FIGS. 8I and 8C are cross-sectional views of components of alternative HCI outlet 400 that illustrate entry into a locked state, whereby outlet 400 may be placed in a permanent or semi-permanent tripped, non-conductive state. The configuration and operation is substantially similar to that discussed with respect to FIGS. 6J and 6C, above, respectively.

Figure 2:
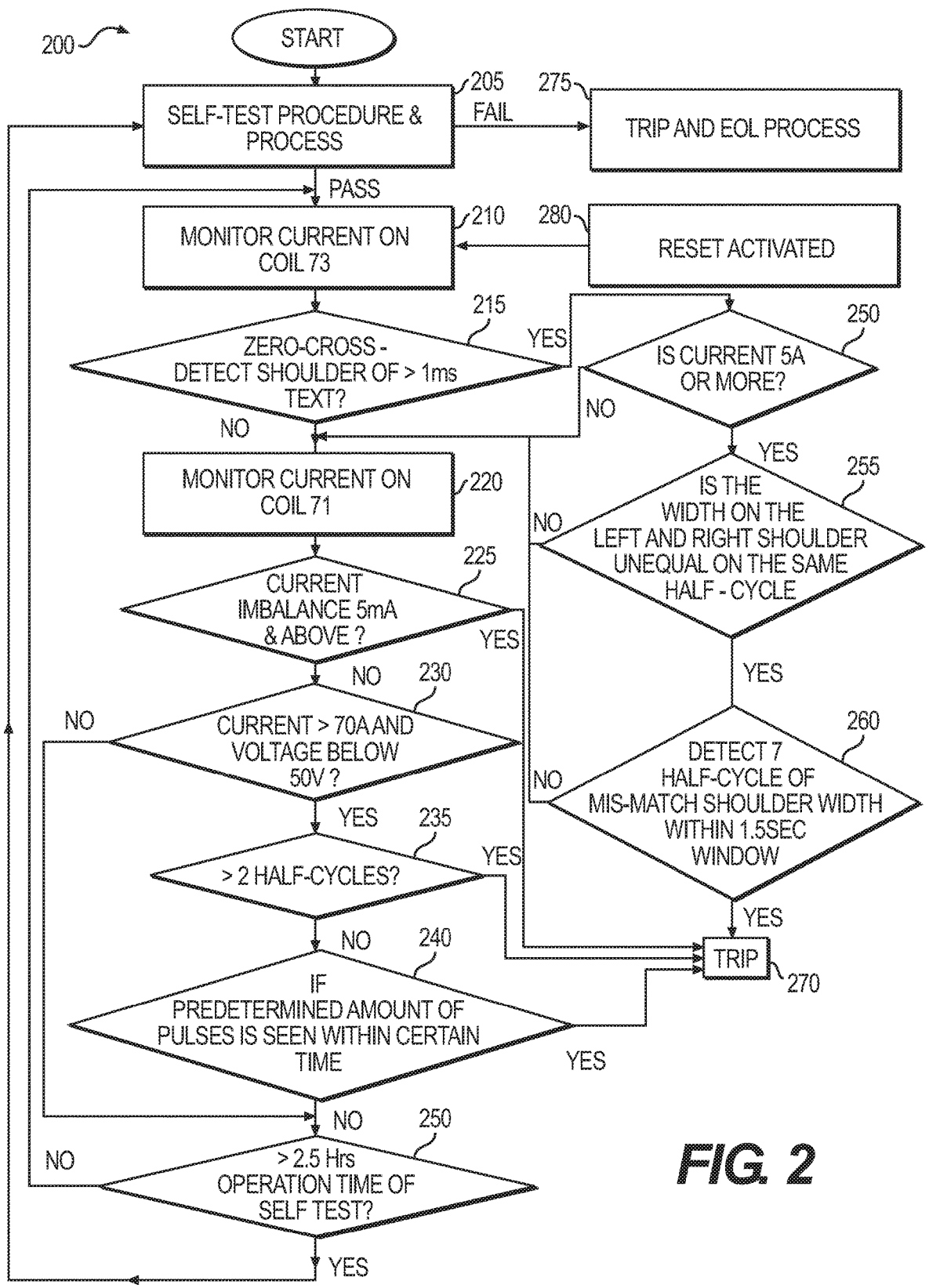
FIG. 2 is a flow diagram of an exemplary method of operation for a processor of a hybrid circuit interrupter, consistent with the present disclosure.

FIG. 2 provides an exemplary algorithm 200 for operation of HCI 400, consistent with instant disclosure. More generally, the steps of this algorithm may be performed by MCU or another computing device, in concert with other elements of HCI circuitry 300. Software embodying the algorithms may be stored in non-volatile storage and/or memory within or outside of a processing device and may be executed by the processing device. As would be apparent to persons of skill in the art, the exact order of certain steps of the disclosed exemplary algorithm embodiments may be altered while still practicing the disclosed algorithms. Similarly, certain steps of the disclosed algorithm embodiments may be substituted, combined, or removed while still practicing the disclosed algorithms—consistent with the disclosure herein and/or as would be apparent to persons of skill in the art.

As in step 205, MCU 221 may perform a self-test of HCI circuit 300 upon power up, or periodically. With reference to the leakage simulation circuit depicted in FIG. 3, this self-test may comprise MCU providing a signal at MCU SIMULATION to switch on an SCR and allow current to flow to ground, through R9 in this example. This self-test may be to assure that HCI circuitry 300 is able to properly detect a leakage current. If the simulated leakage current is detected, the self-test may be considered passed. MCU may then indicate that the HCI circuit 300 is normally operating by energizing, for example, a sold green LED indicator that is preferably visible on the face of the HCL device. If the test is passed, the process may proceed to step 210.

However, if the HCI circuit 300 fails a first internal self-test, a rest period, for example, 5 minutes, may be permitted to pass before the self-test is repeated. In some embodiments, a predetermined number of retesting and resting cycles may occur, for example, five cycles, before the HCI is deemed to be in an EOL condition. If the HCI outlet 400 has been determined to have reached its end of life, the process may proceed to step 275.

As in step 275, MCU may deliver a triggering pulse or activation signal, e.g., at TRIG1, to trigger the trip coil assembly 18 and trip the HCI, as well as a second triggering pulse or activation signal, e.g., at TRIG of MCU, to place the tripped HCI 400 in locked state via reset blocking coil assembly 19, as described above. MCU may then place HCI device 400 into an EOL state by permanently disabling its capability of providing a signal at TRIG that could reverse the locking mechanism. Further, an alert indication of, for example, a blinking red LED may be activated to signify the EOL state to the user. Once in the EOL state, the device will not be able to be reset or return back to normal operation. The process is ended.

As in step 210, MCU may monitor the current of supplied power via coil 73, for example at I_RECT in FIG. 3. The process may proceed to step 215.

Then, as in step 215, MCU may assess the time-domain signature derived from the current through coil 73 at I_ZC, with reference to FIG. 3. In step 215, MCU may determine whether the pulse-width of the low of the rectangular wave form of I_ZC is more than approximately 1 ms or another predetermined amount of time. Values approximating 1 ms may encompass values within 0.1 ms of 1 ms. A pulse-width of more than 1 ms may be considered significant because a normal pulse width, e.g., based on 60 HZ, may be 8.33 ms. If 1 ms is exceeded, the process continues to step 250. Otherwise the process continues at step 220.

As in step 250, MCU may assess whether the maximum current of the RMS current (e.g., I_RECT) is at or above a threshold arc detection current. If the maximum current is above a detection threshold, for example, approximately 5 A, it may be determined that a series arc is possibly occurring. Values approximating 5 A may encompass values within 0.5 A of 5 A. If the RMS current is greater than the threshold arc detection current, the process continues at step 255. Otherwise the process continues at step 220.

As in step 255, MCU may assess the duty cycle of time-domain signature (e.g., the I_ZC rectangular waveform). If, for example, the time-domain signature has a duty cycle above a maximum duty cycle detection threshold, for example, at or between 55% and 60%, and/or below a minimum duty cycle detection threshold, for example, at or between 40% and 45%, it may be determined that an arc is occurring. However, at this step, MCU may also cross-reference the time-domain signature with pre-supplied values that maybe indicative of electrical phenomena other than arcing, such as, switching a power supply, or using a dimmer switch. If the duty cycle contravenes the threshold value(s) and does not fit within cross-referenced values, the process may proceed to step 260. If not, the process may proceed to step 220.

As in step 260, MCU may confirm the presence of an arc where the duty cycle remains outside of the maximum and/or minimum duty cycle thresholds at least a threshold number of cycles, for example, 3.5 cycles of duty cycle, within a measurement window. The measurement window may be, for example, at least 1.5 seconds, which is based on the UL 1699 standard. If the duty cycle remains outside of the maximum and/or minimum duty cycle thresholds for at least the threshold number of cycles within the measurement window, it may be determined that a series arc fault is occurring; the process may proceed to step 270. If not, the process may proceed to step 220.

As in step 220, MCU may monitor the current imbalance via coil 71 and coil 72. With reference to FIG. 3, current imbalance may be detected at GFI_FAULT. The process may proceed to step 225.

As in step 225, MCU may assess whether there is an imbalance in the current flowing through the neutral and live lines based on the measurements of step 220. If the imbalance is greater than a current imbalance threshold, for example 5 mA, it may be determined that there is a ground fault and the process may proceed to step 270. If not, the process may proceed to step 230.

As in step 230, MCU may assess whether the RMS current is greater than a maximum current threshold, for example, approximately 70 A, and the RMS voltage is less than a minimum voltage threshold, for example, approximately 50V. Values approximating 70 A may encompass values within 7 A of 70 A. Values approximating 50V may encompass values within 5V of 50 A. If both thresholds are contravened, the process may proceed to step 235. If not, the process may proceed to step 250.

As in step 235, MCU may assess whether maximum current threshold and the minimum voltage threshold are contravened for a predetermined number of AC periods, for example, 1 AC period. If the thresholds remained contravened for the predetermined number of periods, it may be determined that a parallel arc fault is occurring; the process may proceed to step 270. If not, the process may proceed to step 240.

As in step 240, MCU may assess the pulse signature of I_ZC. Specifically, MCU may determine whether more that a predetermined pulse count, for example, more than one pulse, occurs in a predetermined amount of time, for example, in one-half of an AC period. Such an occurrence may be considered a multi-pulse signature. If the multi-pulse signature is present for a predetermined number of periods, for example one complete AC period, it may be determined that a parallel arc fault is occurring. Then, the process may proceed to step 270. If not, the process may proceed to step 245.

As in step 245, MCU may determine whether it is time for an automatic, periodic self-test. In preferred embodiments, a periodic self-test will occur on a 2.5 hour interval, or maybe between 1 and 3 hours. The self-test interval may be programmed into MCU. It may follow UL or other industrial specifications or regulatory requirements. If it is time for a self-test, the process proceeds back to step 205. If not, the process cycles back to continue at step 210.

As in step 270, upon a determination that there is an electrical fault, MCU delivers a triggering pulse or activation signal, e.g., TRIG1, to trigger the trip coil assembly 18. As described above, for example with reference to FIGS. 6G, 6H, and 8G, the triggering of the trip coil assembly 18 will disconnect the power supply of the HCI device. The process ends and may restart, at step 180, upon a manual pressing (and release) of the RESET button, as in step 280 and as described above with respect to FIGS. 6D-6F and 8D-8F.

In some embodiments, in addition to or alternatively to the self-test procedure, MCU may periodically monitor its the operating conditions, for example, input voltage and input current to ensure normal operating conditions. As an example, step 205, discussed above, may be included in such monitoring instead of its position within the flowchart of FIG. 2. Such monitoring may proceed, for example, every 10-15 minutes. In the event that there is an abnormal operating condition detected during the constantly monitoring process, MCU may cause a red LED to blink as an indication of such an error. Thus, if such a situation persists, a user may be alerted to investigate possible causes of such irregularities by the blinking red LED.

In the preceding specification, various preferred embodiments have been described with reference to the accompanying drawings. It will, however, be evident that various other modifications and changes may be made thereto, and additional embodiments may also be implemented, without departing from the broader scope of the invention as set forth in the claims that follow.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

We claim:

1. A circuit interrupter, comprising:
   a main processing circuit comprising a processor,
   a trip coil assembly;
   a reset blocking assembly with a locked position and an unlocked position,
   wherein:
      the main processing circuit is configured to generate a tripping signal if a ground fault, an arc fault, or both is determined to exist;
      the reset blocking assembly is configured to mechanically prevent the resetting of the circuit interrupter in the locked position;
      the trip coil assembly is configured to trip the circuit interrupter upon receiving the tripping signal;
      the reset blocking assembly is configured to move into the locked position upon receiving a locking signal from the main processing circuit;
      the main processing circuit is further configured to generate the locking signal if a ground fault, an arc fault, or both is determined to exist; and
      the reset blocking assembly comprises:
         a reset blocking steel piece;
         a reset blocking attraction plate;
         a reset blocking iron core;
         a reset blocking frame;
         a reset blocking housing; and
         a reset blocking spring.

2. The circuit interrupter of claim 1, wherein the reset blocking steel is comprised of steel.

3. The circuit interrupter of claim 1, wherein the reset blocking steel piece comprises a reset guide hole with a reset blocking portion.

4. The circuit interrupter of claim 1, further comprising a reset button assembly, wherein:
   the reset button assembly includes a reset rod with reset rod locking hole and a reset rod blocking shoulder.

5. The circuit interrupter of claim 3, further comprising a reset button assembly, wherein:
   the reset button assembly includes a reset rod with a reset rod locking hole and a reset rod blocking shoulder.

6. The circuit interrupter of claim 5, wherein:
   when the reset blocking assembly is in the locked position, the reset rod is positioned within the reset blocking portion of the reset guide hole of the reset blocking steel and the reset rod blocking shoulder of reset rod abuts a top surface of the reset blocking steel piece.

7. The circuit interrupter of claim 1, wherein:
   the reset blocking assembly includes a reset blocking steel piece; and
   the reset blocking assembly is configured to extend the reset blocking steel piece in response to receiving the locking signal.

8. The circuit interrupter of claim 1, further comprising:
   a coil housing;
   a first coil disposed within the coil housing;
   a second coil disposed within the coil housing; and
   a third coil disposed within the coil housing.

9. The circuit interrupter of claim 1, wherein the reset blocking steel piece comprises a reset guide hole with a reset blocking portion.

10. A circuit interrupter, comprising:
    a main processing circuit comprising a processor,
    a trip coil assembly;
    a reset blocking assembly with a locked position and an unlocked position,
    wherein:
       the main processing circuit is configured to generate a tripping signal if a ground fault, an arc fault, or both is determined to exist;
       the reset blocking assembly is configured to mechanically prevent the resetting of the circuit interrupter in the locked position;
       the trip coil assembly is configured to trip the circuit interrupter upon receiving the tripping signal;
       the reset blocking assembly is configured to move into the locked position upon receiving a locking signal from the main processing circuit; and
       the reset blocking assembly is configured to move into the unlocked position upon receiving a withdrawal signal from the main processing circuit.

11. The circuit interrupter of claim 10, wherein:
    if the circuit interrupter is in an end-of-life state, the main processing circuit is permanently disabled from providing the withdrawal signal.

12. The circuit interrupter of claim 10, further comprising:
    a coil housing;
    a first coil disposed within the coil housing;
    a second coil disposed within the coil housing; and
    a third coil disposed within the coil housing.

13. The circuit interrupter of claim 10, further comprising a reset button assembly, wherein:
    the reset button assembly includes a reset rod with reset rod locking hole and a reset rod blocking shoulder.

14. The circuit interrupter of claim 13, further comprising a reset button assembly, wherein:
    the reset button assembly includes a reset rod with a reset rod locking hole and a reset rod blocking shoulder.

15. The circuit interrupter of claim 14, wherein:
    when the reset blocking assembly is in the locked position, the reset rod is positioned within the reset blocking portion of the reset guide hole of the reset blocking steel and the reset rod blocking shoulder of reset rod abuts a top surface of the reset blocking steel piece.

16. A circuit interrupter, comprising:
a reset button assembly;
a trip coil assembly;
a reset blocking assembly with a locked position and an unlocked position,
wherein:
   the reset blocking assembly is configured to mechanically engage with the reset button assembly in the locked position; and
   the reset blocking assembly comprises:
      a reset blocking steel piece;
      a reset blocking attraction plate;
      a reset blocking iron core;
      a reset blocking frame;
      a reset blocking housing; and
      a reset blocking spring.

17. The circuit interrupter of claim 16, wherein the reset blocking steel piece comprises a reset guide hole with a reset blocking portion.

18. The circuit interrupter of claim 17, wherein:
the reset button assembly includes a reset rod with reset rod locking hole and a reset rod blocking shoulder.

19. The circuit interrupter of claim 18, wherein:
when the reset blocking assembly is in the locked position, the reset rod is positioned within the reset blocking portion of the reset guide hole of the reset blocking steel and the reset rod blocking shoulder of reset rod abuts a top surface of the reset blocking steel piece.

20. The circuit interrupter of claim 16, further comprising:
a coil housing;
a first coil disposed within the coil housing;
a second coil disposed within the coil housing; and
a third coil disposed within the coil housing.

* * * * *